(12) United States Patent
Sato et al.

(10) Patent No.: US 9,946,288 B2
(45) Date of Patent: Apr. 17, 2018

(54) ENERGY MANAGEMENT SYSTEM, TERMINAL DEVICE, DISPLAY CONTROL METHOD, AND PROGRAM

(71) Applicant: Mitsubishi Electric Corporation, Tokyo (JP)

(72) Inventors: Kaori Sato, Tokyo (JP); Hirotoshi Yano, Tokyo (JP); Masaaki Yabe, Tokyo (JP); Yuki Ogawa, Tokyo (JP); Satoshi Minezawa, Tokyo (JP); Ichiro Maruyama, Tokyo (JP); Satoshi Endo, Tokyo (JP); Masayuki Komatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 14/907,843

(22) PCT Filed: Aug. 4, 2014

(86) PCT No.: PCT/JP2014/070453
§ 371 (c)(1),
(2) Date: Jan. 27, 2016

(87) PCT Pub. No.: WO2015/019991
PCT Pub. Date: Feb. 12, 2015

(65) Prior Publication Data
US 2016/0161964 A1 Jun. 9, 2016

(30) Foreign Application Priority Data
Aug. 7, 2013 (JP) .................................. 2013-164231

(51) Int. Cl.
*G05F 1/66* (2006.01)
*G05B 15/02* (2006.01)
(Continued)

(52) U.S. Cl.
CPC ............... *G05F 1/66* (2013.01); *G05B 15/02* (2013.01); *G06F 13/00* (2013.01); *G06Q 10/00* (2013.01); *G06Q 50/06* (2013.01); *H02J 13/001* (2013.01)

(58) Field of Classification Search
CPC .......... G05F 1/66; H02J 13/001; G05B 15/02; G06Q 50/06; G06Q 10/00; G06F 13/00
See application file for complete search history.

(56) References Cited

U.S. PATENT DOCUMENTS 9,031,730 B2 * 5/2015 Ikeda .................... B25J 9/0003
701/23
2005/0131991 A1 6/2005 Ogawa et al.
(Continued)

FOREIGN PATENT DOCUMENTS

JP 2002-133568 A 5/2002
JP 2002-218562 A 8/2002
(Continued)

OTHER PUBLICATIONS

Office Action dated Apr. 5, 2016 in the corresponding JP application No. 2013-164231 (with partial English translation).
(Continued)

*Primary Examiner* — Charles Kasenge
(74) *Attorney, Agent, or Firm* — Posz Law Group, PLC

(57) ABSTRACT

An acquirer acquires information concerning an energy management system for controlling a plurality of apparatuses installed in a dwelling. A display displays, in a first display region, the information acquired by the acquirer, and displays, in a second display region, a layout diagram in which images indicating the apparatuses are arranged at positions corresponding to installation locations of the apparatuses in the dwelling. Upon a determination that the information displayed in the first display region includes information concerning a specific apparatus among the
(Continued)

plurality of apparatuses, the display displays with relative emphasis an image indicating the specific apparatus in the second display region.

11 Claims, 18 Drawing Sheets

(51) Int. Cl.
*G06F 13/00* (2006.01)
*G06Q 10/00* (2012.01)
*G06Q 50/06* (2012.01)
*H02J 13/00* (2006.01)

(56) References Cited

U.S. PATENT DOCUMENTS

| | | | |
|---|---|---|---|
| 2010/0214317 A1* | 8/2010 | Miura | H04L 12/12 345/641 |
| 2012/0217801 A1 | 8/2012 | Yamashita | |
| 2012/0221956 A1* | 8/2012 | Geadelmann | G05B 15/02 715/736 |
| 2012/0296488 A1* | 11/2012 | Dharwada | H02J 13/001 700/296 |
| 2012/0306882 A1* | 12/2012 | Kashiwagi | G01D 4/00 345/440 |
| 2014/0340075 A1 | 11/2014 | Doi et al. | |

FOREIGN PATENT DOCUMENTS

| | | |
|---|---|---|
| JP | 2005-020650 A | 1/2005 |
| JP | 2009-254916 A | 11/2009 |
| JP | 2009-282892 A | 12/2009 |
| JP | 2010-273457 A | 12/2010 |
| JP | 2011-027362 A | 2/2011 |
| JP | 2011-182183 A | 9/2011 |
| JP | 2012-133764 A | 7/2012 |
| JP | 2012-134957 A | 7/2012 |
| JP | 2012-181055 A | 9/2012 |
| JP | 2012-208684 A | 10/2012 |
| JP | 2012-238180 A | 12/2012 |
| JP | 2013-106414 A | 5/2013 |
| WO | 2012/074053 A1 | 6/2012 |
| WO | 2013/018834 A1 | 2/2013 |
| WO | 2013/069671 A1 | 5/2013 |

OTHER PUBLICATIONS

Office Action dated Sep. 8, 2017 issued in corresponding CN patent application No. 201480044488.6 (and English translation attached).
Extended European Search Report dated Mar. 29, 2017 issued in corresponding EP patent application No. 14833893.2.
International Search Report of the International Searching Authority dated Nov. 11, 2014 for the corresponding International application No. PCT/JP2014/070453 (and English translation).
Office Action dated Aug. 25, 2015 in the corresponding JP patent application No. 2013-164231 (and English translation).
Office Action dated Nov. 11, 2014 in the corresponding JP patent application No. 2013-164231 (and English translation).
Office Action dated Sep. 13, 2016 issued in corresponding KR patent application No. 10-2016-7004404 (and partial English translation).

* cited by examiner

| ROOM ID NUMBER | FLOOR NUMBER | ROOM NAME | ROOM SIZE (TATAMI MAT(S)) | ... |
|---|---|---|---|---|
| 101 | 1 | CLOSET | 4 | ... |
| 102 | 1 | STUDY | 6 | ... |
| 103 | 1 | LIVING ROOM | 14 | ... |
| 104 | 1 | CHILDREN'S ROOM | 6 | ... |
| 201 | 2 | JAPANESE-STYLE ROOM | 6 | ... |
| 202 | 2 | BEDROOM | 8 | ... |
| 203 | 2 | BATHROOM | 4 | ... |
| ... | ... | ... | ... | ... |

FIG. 4B

Basic Information Input Screen

Floor Number: 2

Family Structure: ☑ Father   ☑ Mother
                  ☐ Son      ☐ Daughter

Floor Layout (1F)

Living Room  14  Tatami Mat(s)

Study  6  Tatami Mat(s)

⋮

| ROOM ID NUMBER | APPARATUS ID NUMBER | APPARATUS NAME | POWER RATING | ... |
|---|---|---|---|---|
| 102 | 0001 | AIR CONDITIONER | 400W | ... |
| | 0002 | TV | 100W | ... |
| | 0003 | FLOOR HEATING | 120W | ... |
| ... | ... | ... | ... | ... |
| 201 | 0005 | AIR CONDITIONER | 400W | ... |
| | 0006 | TV | 100W | ... |
| | 0007 | FLOOR HEATING | 120W | ... |
| ... | ... | ... | ... | ... |

FIG. 7

| SCHEDULE | USER | SCHEDULE CONTENTS | SCHEDULE START DATE/TIME | SCHEDULE END DATE/TIME | REPEAT |
|---|---|---|---|---|---|
| SCHEDULE X | FATHER | WORK | 4/23/2013 7:30 | 4/23/2013 19:30 | ON |
| SCHEDULE Y | MOTHER | SHOPPING | 4/23/2013 10:00 | 4/23/2013 12:00 | OFF |
| SCHEDULE Z | SON | SCHOOL | 4/23/2013 8:00 | 4/23/2013 17:00 | ON |
| ... | ... | ... | ... | ... | ... | ions and thus can provide a large volume of information to users. Consequently, in many cases displaying all information on a single screen is difficult. In addition, the volume of information provided on a single screen tends to be large, causing the user to become confused. However, when the information provided to the user is simply restricted, the problem arises that the complete image and connections among the items of information cannot be seen.

ENERGY MANAGEMENT SYSTEM, TERMINAL DEVICE, DISPLAY CONTROL METHOD, AND PROGRAM

CROSS REFERENCE TO RELATED APPLICATIONS

This application is the U.S. national phase of International Patent Application No. PCT/JP2014/070453 filed on Aug. 4, 2014 and is based on Japanese Patent Application No. 2013-164231 filed on Aug. 7, 2013, the disclosures of which are incorporated herein by reference.

TECHNICAL FIELD

The present disclosure relates to an energy management system, a terminal device, a display control method, and a program.

BACKGROUND ART

There is a system known as a home energy management system (HEMS) that connects home appliances to a communication network and manages the appliances in an integrated manner using a control device. In recent years, a HEMS has been known that enables a user to remotely operate in-home appliances via the Internet and/or the like from outside the dwelling, even when the user is not in the dwelling. The HEMS monitors power consumption so that the user can efficiently use electric power.

For example, Patent Literature 1 discloses a power management device in which electric apparatuses are classified into a plurality of groups, power management objects are used for each group and information relating to power consumed by the electric apparatuses belonging to each group is displayed in a power management object. Furthermore, each power management object is displayed as a collective object with a clip-shaped object, just like a set of cards bundled together using a clip.

On the other hand, there is also a so-called gadget that extracts a number of items of information from among various items of information and provides a simple representation of the extracted information on a computer screen. The gadget is used in order to collect many items of information compactly and provide such to the user.

CITATION LIST

Patent Literature

Patent Literature 1: Unexamined Japanese Patent Application Kokai Publication No. 2013-106414

SUMMARY OF INVENTION

Technical Problem

Meanwhile, HEMSs in recent years have multiple functions and thus can provide a large volume of information to users. Consequently, in many cases displaying all information on a single screen is difficult. In addition, the volume of information provided on a single screen tends to be large, causing the user to become confused. However, when the information provided to the user is simply restricted, the problem arises that the complete image and connections among the items of information cannot be seen.

In consideration of the foregoing, it is an objective of the present disclosure to provide to a user a management screen in which the relationships among items of information can easily be understood.

Solution to Problem

In order to achieve the above objective, the energy management system according to the present disclosure is an energy management system for controlling a plurality of apparatuses installed in a dwelling, the energy management system comprising:

an acquirer configured to acquire information concerning the energy management system; and a display configured to display, in a first display region, the information acquired by the acquirer, and to display, in a second display region, a layout diagram in which images indicating the plurality of apparatuses are arranged at positions corresponding to installation locations of the plurality of apparatuses in the dwelling;

wherein upon a determination that the information displayed in the first display region includes information concerning a specific apparatus among the plurality of apparatuses, the display displays an image indicating the specific apparatus in the second display region with relative emphasis.

Advantageous Effects of Invention

It is possible to provide to a user a management screen in which the relationships among items of information can easily be understood.

BRIEF DESCRIPTION OF DRAWINGS

FIG. 2 is a drawing showing one example of an arrangement of rooms in a dwelling and an arrangement of home appliances and/or the like;

FIG. 4A is a drawing showing a configuration example of a layout definition table;

FIG. 4B is a drawing showing a configuration example of a basic information input screen;

FIG. 7 is a drawing showing a configuration example of a schedule table;

DESCRIPTION OF EMBODIMENTS

First Embodiment

Figure 1:
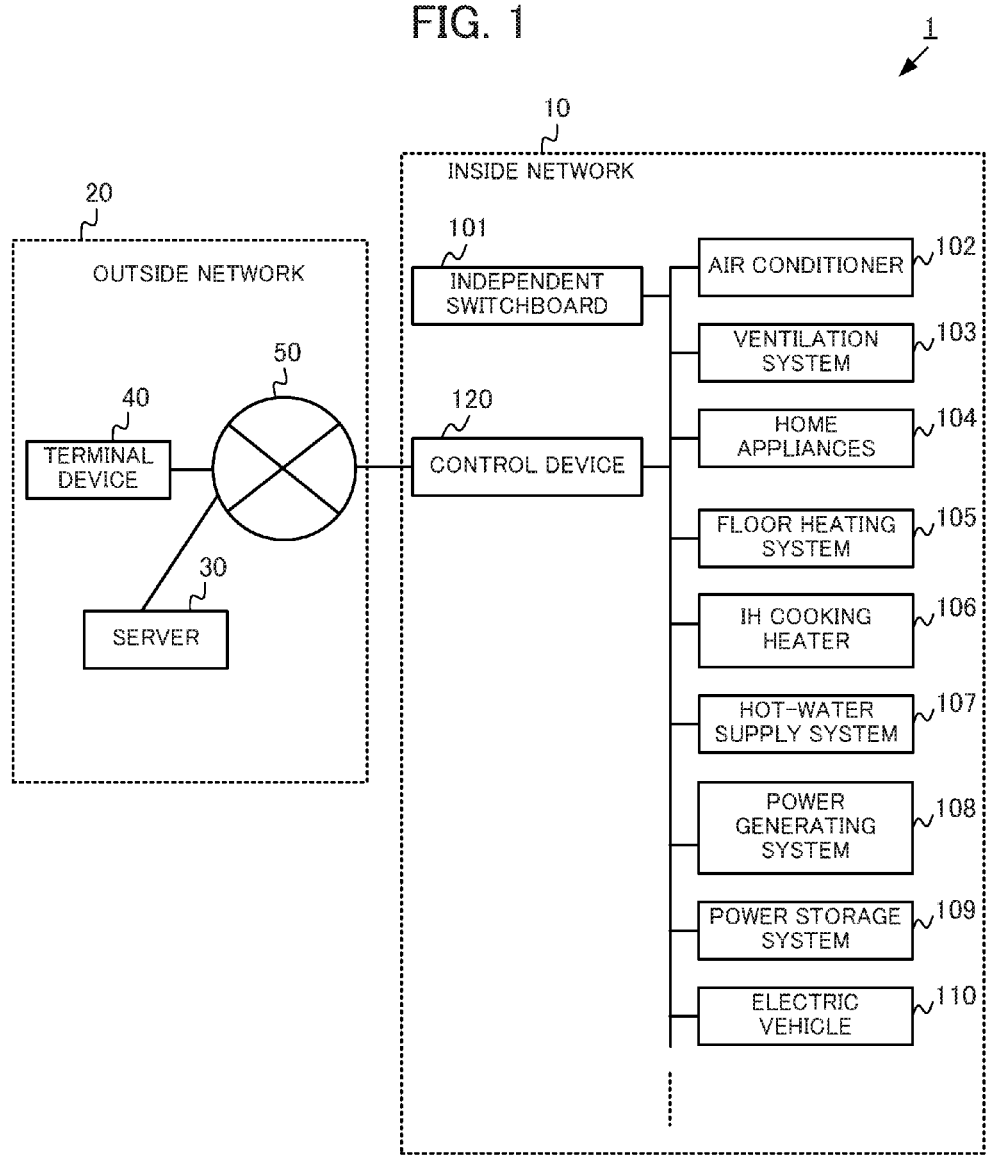
FIG. 1 is a drawing showing a configuration of an energy management system.

FIG. 1 shows a configuration of an energy management system 1 according to the present embodiment. The energy management system 1 monitors the amount of power consumed by various apparatuses and systems installed in a dwelling (demand house), and in addition controls operations of the apparatuses and systems.

An inside network 10 includes an independent switching board 101, an air conditioner 102, a ventilation system 103, other home appliances 104 such as television receivers, lighting fixtures and/or the like, a floor heating system 105, an induction heating (IH) cooking heater 106, and a hot-water supply system 107.

Furthermore, the inside network 10 includes a power generating system 108 using sunlight and/or the like, a power storage system 109 provided with storage cells, an electric vehicle 110 provided with storage cells capable of being removed at any time, and a control device 120.

Indoor power lines (not shown) of the energy management system 1 are connected to a commercial power source of a power company via the independent switching board 101.

The above-described devices and systems included in the inside network 10 are connected to the indoor power lines, and receive a supply of electric power from at least one of the commercial power source, the power generating system 108, the power storage system 109 and the electric vehicle 110.

In addition, each of the various apparatuses or systems is equipped with a not-shown wireless communication device and is capable of wireless communication with the control device 120. However, all or a portion of the communication may be conducted via cables.

Furthermore, at a plurality of positions on the indoor power lines in the energy management system 1, not-shown power measuring devices are installed. The power measuring devices successively detect, for example, the amount of power consumed by the air conditioner 102, the ventilation system 103, the home appliances 104, the floor heating system 105, the IH cooking heater 106, the hot-water supply system 107, the power generating system 108, the power storage system 109 and the electric vehicle 110. The measurement results are sent to the control device 120.

The inside network 10 is linked to an outside network 20, which includes a server 30, a terminal device 40 and a communication network 50. The communication network 50 is typically the Internet. A user is able to manipulate the various apparatuses and systems in the inside network 10 through remote manipulation using the terminal device 40 in the outside network 20.

The server 30 relays communication between the terminal device 40 and the control device 120. The terminal device 40 sends commands and/or the like to the server 30, and the server 30 sends the received commands and/or the like to the control device 120. For simplicity, statements regarding the server 30 are omitted in the description below, as in the phrase that the terminal device 40 sends commands to the control device 120.

The terminal device 40 is capable of accessing the inside network 10 and the outside network 20 through wireless communication. For example, the terminal device 40 is a mobile phone handset, a personal computer (PC), a tablet PC and/or the like. Naturally while inside the dwelling and even when outside, a user can carry the terminal device 40 and can remotely manipulate the various apparatuses and systems in the energy management system 1 using the terminal device 40.

Operation modes of the energy management system 1 are roughly divided into two types. One is a linked mode in which the indoor power lines are linked to the commercial power source by the independent switching board 101 and receive a supply of electric power from the commercial power source. In the linked mode, electric power generated by the power generating system 108 can also be supplied (sold) to the commercial power source.

The other mode is an independent mode in which the indoor power lines are cut off from the commercial power source by the independent switching board 101, a supply of electric power is not received from the commercial power source, and the dwelling is supplied with electric power generated by the power generating system 108, electric power stored in the power storage system 109, and/or electric power stored in the electric vehicle 110.

The operating modes are switched by the independent switching board 101 on the basis of detection results indicating a supply status of electric power from the commercial power source, detected by the independent switching board 101. Typically, the independent mode is established when the commercial power source has a power outage, and the linked mode is established when the commercial power source is not having a power outage.

Figure 2:
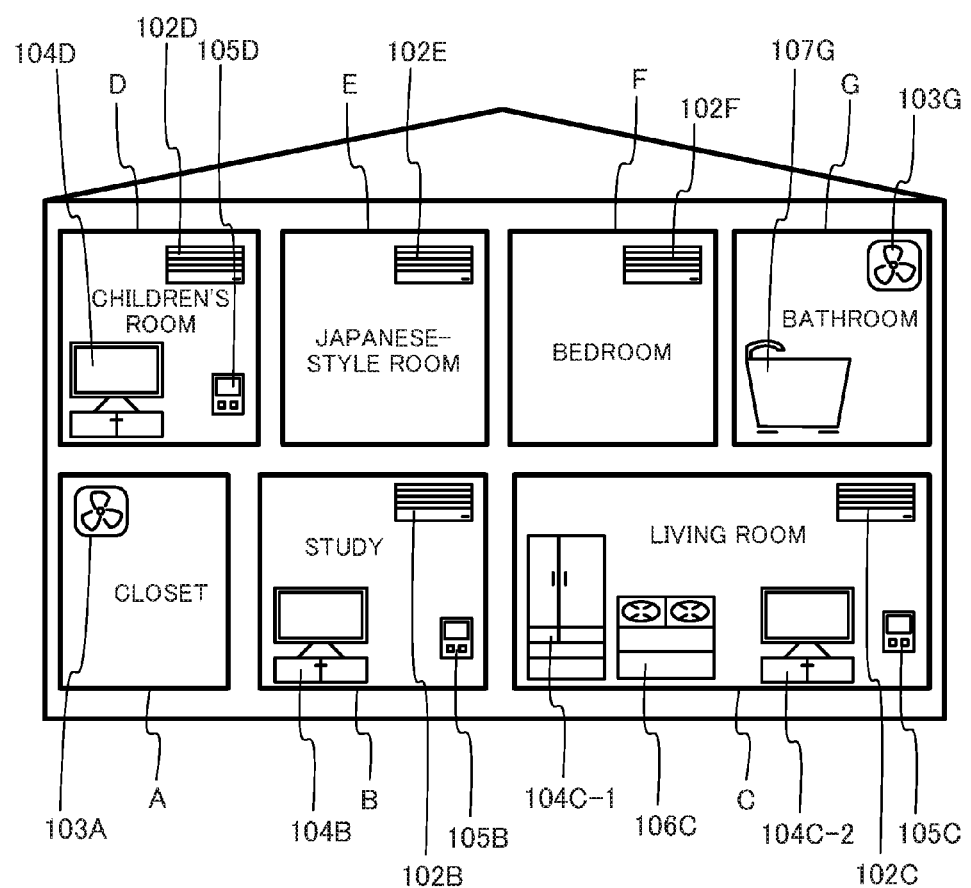

Each of the apparatuses and systems shown in FIG. 1 can be installed at any location in the dwelling. FIG. 2 shows one example of a layout diagram indicating an arrangement of rooms in the dwelling and an arrangement of the home appliances 104 and/or the like installed in the dwelling. In the dwelling of this embodiment, there are seven spaces, that is to say, a closet A, a study B, a kitchen and living room (hereafter abbreviated as "living room") C, a children's room D, a Japanese-style room E, a bedroom F and a bathroom G. In each of these spaces, various apparatuses or systems controllable by the control device 120 are installed.

In the closet A, a ventilation system 103A is installed, for example.

In the study B, an air conditioner 102B, a home appliance 104B (television receiver) and a floor heating system 105B are installed, for example.

In the living room C, an air conditioner 102C, a home appliance 104C-1 (refrigerator), a home appliance 104C-2 (television receiver), a floor heating system 105C and an IH cooking heater (IHCH) 106C are installed, for example.

In the children's room D, an air conditioner 102D, a home appliance 104D (television receiver) and a floor heating system 105D are installed, for example.

In the Japanese-style room E, an air conditioner 102E is installed, for example.

In the bedroom F, an air conditioner 102F is installed, for example.

In the bathroom G, a ventilation system 103G and a hot-water supply system 107G are installed, for example.

The various apparatuses and systems noted in the various rooms A-G each communicate with the control device 120 and can be controlled by the control device 120.

The layout of rooms, the types of apparatuses and systems installed in each room, the number of apparatuses and systems, and the installation locations of apparatuses and systems shown in FIG. 2 are intended to be merely illustrative and non-limiting examples.

Figure 3:
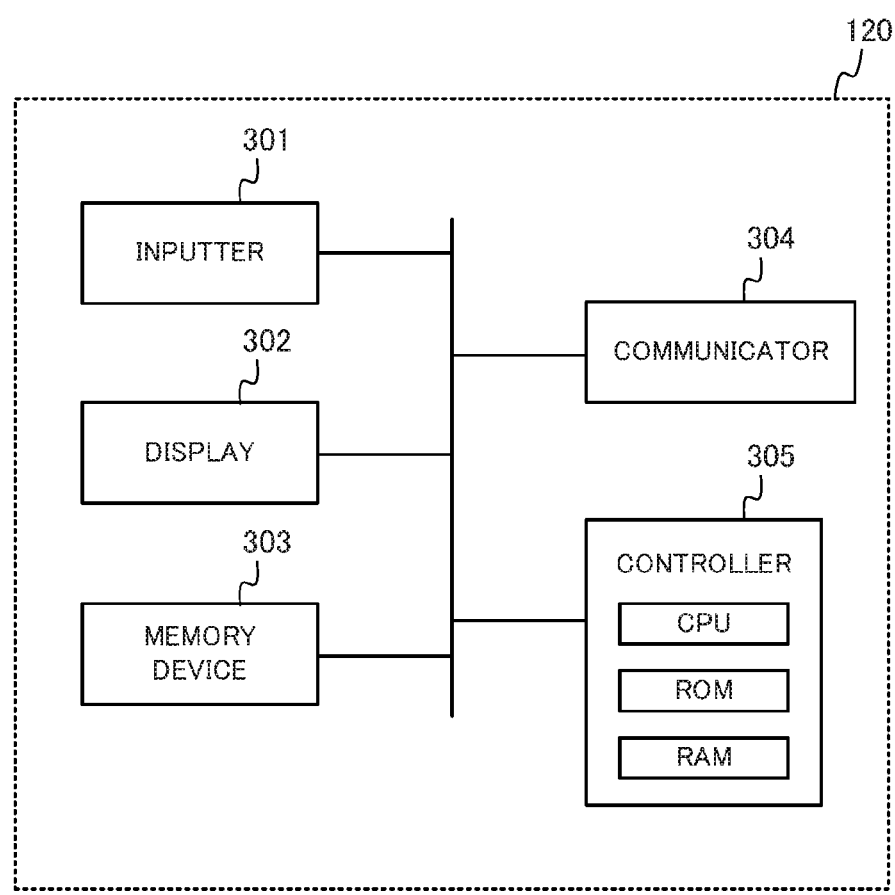
FIG. 3 is a drawing showing a configuration of a control device.

Next, a configuration of the control device 120 is described with reference to FIG. 3. The control device 120 monitors and controls the entirety of the energy management system 1.

An inputter 301 includes an input device such as a button, keyboard, touch panel and/or the like. The inputter 301 receives instructions input from a user.

A display 302 includes a display device such as a liquid crystal display (LCD) and/or the like, and displays on the display device a screen (hereafter referred to as a "management screen") that displays the status of the energy management system 1 and is used by the user to input various instructions. Details are described below.

A memory device 303 includes a non-volatile memory. The memory device 303 stores a program executed by a controller 305, and also stores a layout definition table 400 shown in FIG. 4A that defines a layout of rooms in the dwelling, an apparatus-room association table 500 shown in FIG. 5A that defines installation locations in the dwelling for the various apparatuses or systems that are targets of control by the control device 120, a room-user association table 600 shown in FIG. 6A that defines associations among the various apparatuses or systems and users, and a schedule table 700 shown in FIG. 7. Details are described below.

A communicator 304 includes a network interface card (NIC), and communicates wirelessly with the various apparatuses or systems in the energy management system 1.

The controller 305 includes a central processing unit (CPU), a read only memory (ROM) for storing programs such as an operating system and/or the like, a random access memory (RAM) that is a work area, and/or the like. The controller 305 executes the programs stored in the memory device 303, and controls the entirety of the control device 120.

A typical server, mainframe, personal computer and/or the like can be used as the control device 120.

FIG. 4A shows a configuration example of a layout definition table 400 in a two-story single-family residence. The layout definition table 400 stores a room identification number, the floor number on which the room is located, the name of the room and the size of the room, associated with each other. The controller 305 can appropriately update the layout definition table 400 on the basis of input from the user.

FIG. 4B shows a configuration example of a basic information input screen in the energy management system 1. The basic information input screen is displayed on the liquid crystal display at the setup time of the energy management system 1, for example. The user inputs basic information such as home layout, family structure and/or the like using the basic information input screen. The controller 305 creates or updates the layout definition table 400 on the basis of input contents from the user.

Figures 5A, 5B:
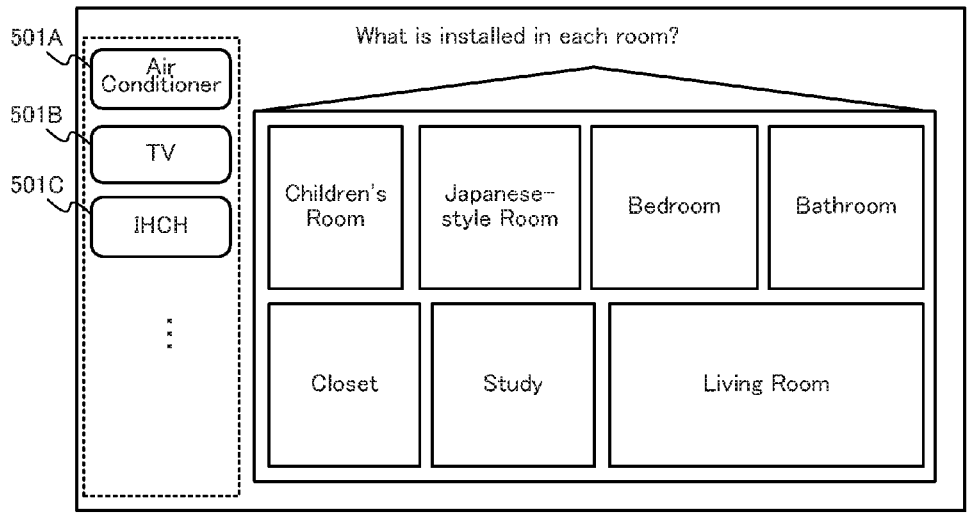
FIG. 5A is a drawing showing a configuration example of an apparatus-room association table.
FIG. 5B is a drawing showing a configuration example of a screen for inputting associations between rooms and apparatuses.

FIG. 5A shows a configuration example of an apparatus-room association table 500. In the apparatus-room association table 500, the identification numbers of apparatuses installed in the room, and the names of those apparatuses, are stored, associated with a room identification number. Characteristic values such as the rated power of the apparatuses, and/or the like may also be stored.

For example, when the user purchases a new apparatus and installs the apparatus in a room, the user manipulates the control device 120 and causes an edit screen of the apparatus-room association table 500 to be displayed, and inputs the room in which the apparatus is installed, the name of the apparatus, and/or the like. The controller 305 appropriately updates the apparatus-room association table 500 on the basis of the input from the user.

FIG. 5B shows a configuration example of the edit screen used by the user to input associations between rooms and apparatuses. The user drags and moves an icon 501 indicating the apparatus (in the drawing, the three icons 501A, 501B and 501C) to inside a frame indicating the room in which the apparatus is installed. The controller 305 creates or updates the apparatus-room association table 500 on the basis of the input contents from the user who used this edit screen.

The control device 120 may update the apparatus-room association table 500 by acquiring information from a server in the outside network 20. A configuration may also be used in which the control device 120 receives input of the apparatus model number and serial number from the user and sends such information to the server, and the server acquires characteristic values such as the rated power of the apparatus corresponding to the model number and the serial number from a database and sends such information to the control device 120, so that the control device 120 can update the apparatus-room association table 500 using the characteristic values acquired from the server.

The controller 305 can create, and display on the display, a schematic diagram of the building as a whole as shown in FIG. 2, on the basis of the layout definition table 400, the apparatus-room association table 500 and template image data indicating the external appearance of the building, apparatuses and/or the like. The schematic diagram need not be an exact diagram that faithfully reproduces reality, but may be a diagram that enables a user to confirm by sight the rooms in which apparatuses or systems are installed.

For example, in the edit screen of FIG. 5B, when the user drags the icon 501A indicating an air conditioner to inside the display region of the living room, the controller 305 arranges, within the display region of the living room, an image indicating the air conditioner. Images indicating the apparatuses or systems need not faithfully reproduce the external appearance of the apparatuses or systems the user has actually installed. In addition, the positions where the images are arranged need not faithfully reproduce the locations where the user has actually installed the apparatuses. The method by which the controller 305 creates the image data indicating the schematic diagram is not limited by the present disclosure.

Figure 6A:
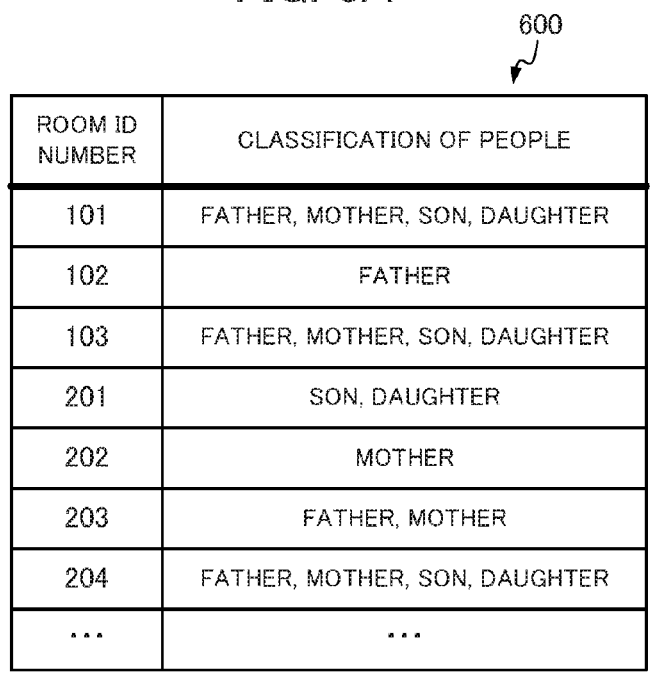
FIG. 6A is a drawing showing a configuration example of a room-user association table.

FIG. 6A shows a configuration example of a room-user association table 600. In the room-user association table 600, information indicating people who primarily use a room is stored, associated with an identification number of the room. For example, the four people, "father", "mother", "son" and "daughter", are associated with the living room having identification number "103".

Figure 6B:
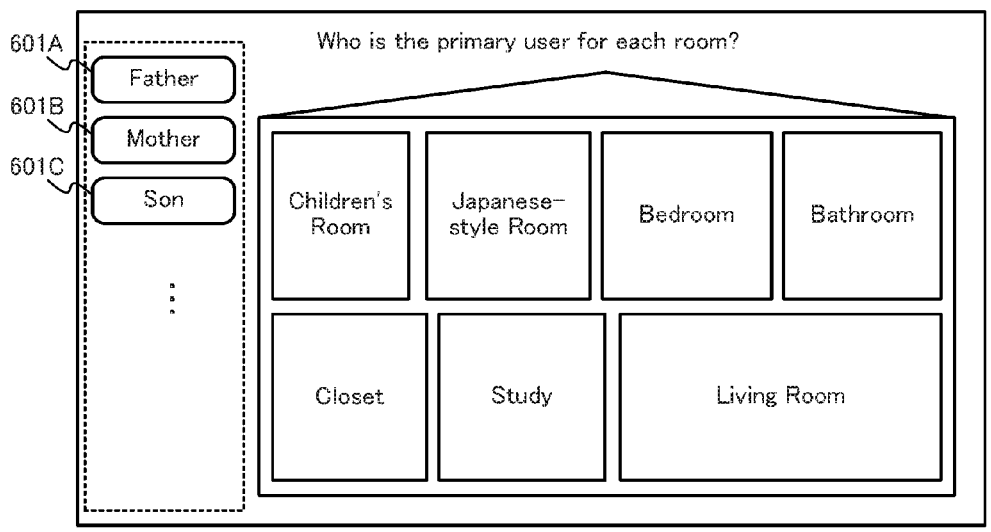
FIG. 6B is a drawing showing a configuration example of a screen for inputting associations between rooms and users.

FIG. 6B shows a configuration example of a screen for inputting associations between rooms and users. The user drags and moves an icon 601 indicating the user (in the drawing, the three icons 601A, 601B and 601C) to inside a frame indicating the installed room, and designates users who primarily use the room. The controller 305 creates, or updates, the room-user association table 600 on the basis of the contents input using this screen.

When the apparatus-room association table 500 and the room-user association table 600 are combined, the identification numbers of the rooms are a common key, and thus an association relationship between apparatuses and users is obtained.

For example, according to the apparatus-room association table 500 of FIG. 5A, the air conditioner 102B having an identification number "0001", the home appliance 104B (television receiver: TV) having an identification number "0002", and the floor heating system 105B having an identification number "0003" are associated with the study B having an identification number "102". In addition, according to the room-user association table 600 of FIG. 6A, "father" is associated with the study having the identification number "102". Accordingly, the controller 305 determines that the three apparatuses, the air conditioner 102B with the identification number "0001", the home appliance 104B with the identification number "0002" and the floor heating system 105B with the identification number "0003", are associated with "father". Similarly, the controller 305 can determine associated users for all of the apparatuses or systems.

FIG. 7 shows a configuration example of a schedule table 700. The schedule table 700 is input by the user using the terminal device 40 or the inputter 301 of the control device 120, and is stored in the memory device 303. In a single schedule, the user, schedule contents, schedule start date and time, schedule end date and time, and a flag indicating whether or not to repeat setting of that schedule are associated with each other. The repeat schedule setting may optionally be daily, weekdays only, holidays only, and/or the like.

The controller 305 of the control device 120 can control the apparatuses and systems on the basis of the schedule stored in the schedule table 700.

For example, according to the schedule table 700 of FIG. 7, during the period from 7:30 on Apr. 23, 2013, to 19:30 on Apr. 23, 2013, "father" is scheduled to be away from home at work. Hence, at this schedule start date and time, when cooling by the air conditioner 102B installed in the room "study (identification number 102)" associated only with father is left on, the controller 305 performs control so that the cooling by the air conditioner 102B is turned off.

Figure 8:
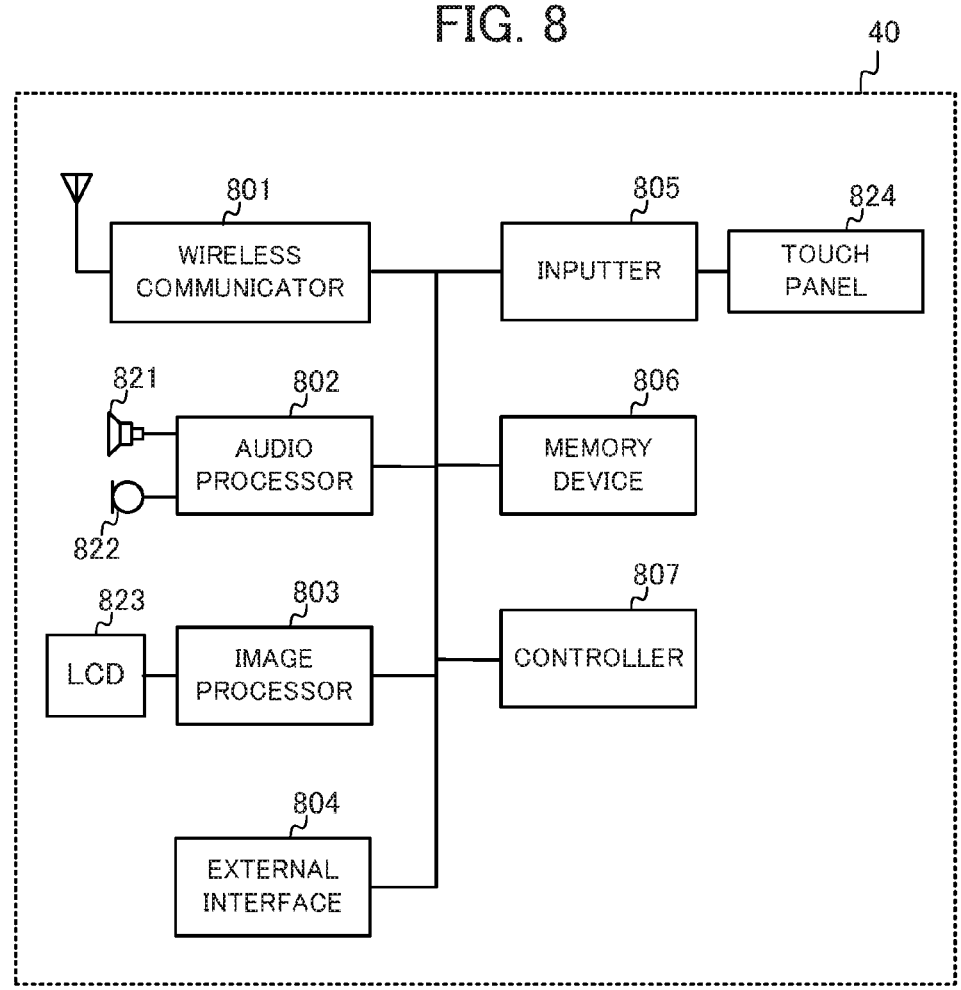
FIG. 8 is a drawing showing a configuration of a terminal device.

Next, a configuration of the terminal device 40 is described with reference to FIG. 8. The terminal device 40 of the present embodiment is a tablet PC equipped with a wireless communication function.

A wireless communicator 801 includes a NIC and an antenna, and communicates with the control device 120.

An audio processor 802 collects the user's voice and/or the like by means of a microphone 822, and converts this data to audio data by means of an A/D converter. In addition, the audio processor 802 reproduces the audio data by means of a D/A converter and outputs the audio from a speaker 821.

An image processor 803 processes image data by means of an image computation processor (not shown), and then stores the processed data in a frame buffer. The image information stored in the frame buffer is converted into an image signal at predetermined synchronization timing, such as vertical synchronization timing and/or the like, and is output to an LCD 823.

An external interface (I/F) 804 inputs and outputs data by connecting to a removable external memory. The external I/F 804 includes an interface that can connect the terminal device 40 and external apparatuses by means of a universal serial bus (USB) and/or the like and can performs input and output of data with external apparatuses.

An inputter 805 receives a manipulation signal from a touch panel 824 and inputs the signal to a controller 807. The controller 807 determines the manipulation contents based on the input manipulation signal. The user can input any text data using the touch panel 824 and input commands to the control device 120.

A memory device 806 includes a hard disk or non-volatile flash memory, and stores an operating system (OS), programs and/or the like necessary for controlling the entirety of the terminal device 40.

The controller 807 includes a CPU, RAM and ROM, and controls the entirety of the terminal device 40.

The user can freely carry the terminal device 40 in the dwelling and manipulate the energy management system 1 remotely. In addition, the user can carry the terminal device 40 outside the dwelling and manipulate the energy management system 1 remotely.

Figure 9:
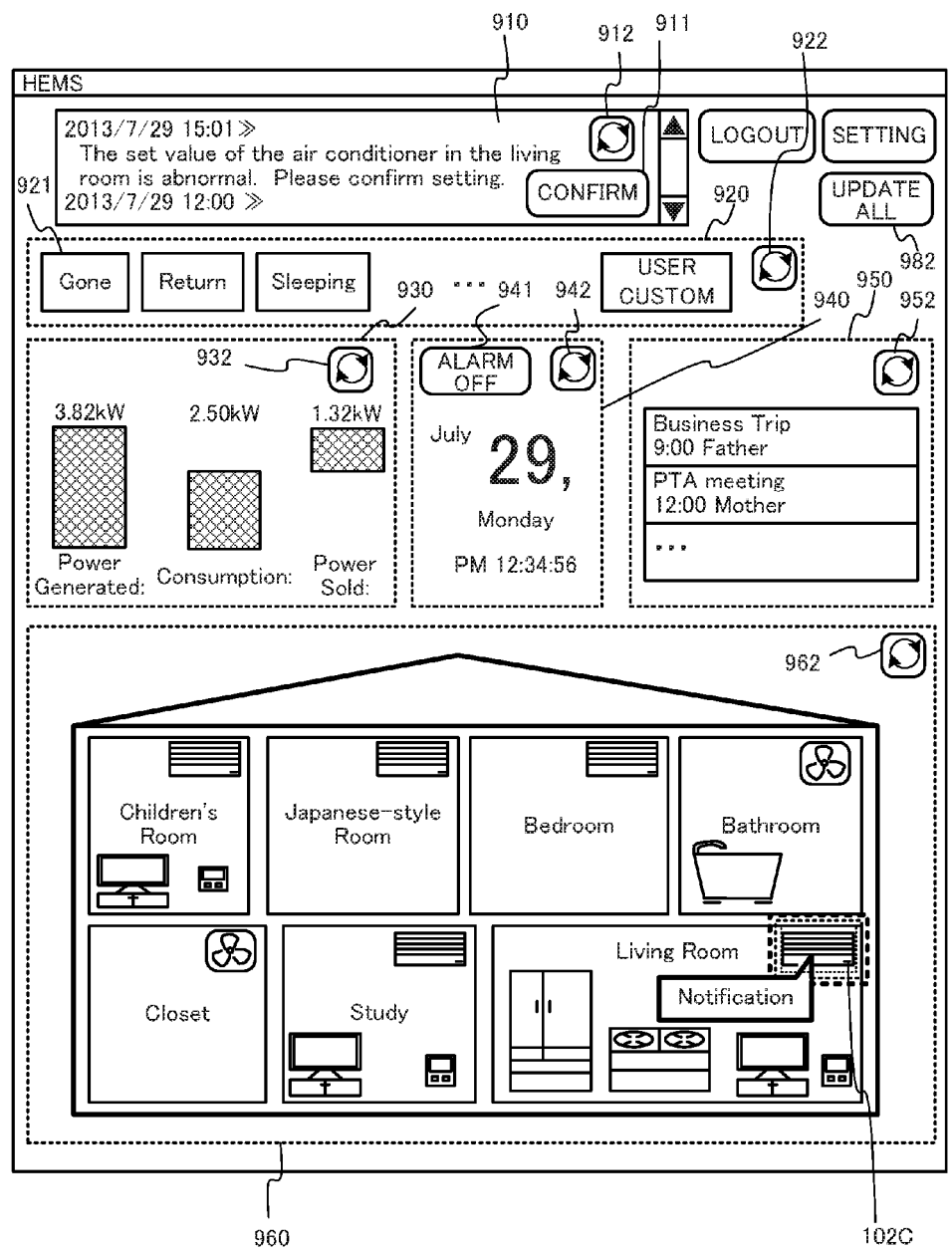
FIG. 9 is a drawing showing a configuration of a management screen.

Next, the management screen in the energy management system 1 is described with reference particularly to FIG. 9.

The management screen is displayed on a display device provided in the control device 120 or an LCD provided in the terminal apparatus 40. The user can observe the current state of the energy management system 1 or input instructions for remote manipulation of the various apparatuses or systems, by means of the management screen.

In the management screen there are display regions divided by function. These display regions are called gadgets (or widgets).

The management screen of this embodiment contains a notification gadget 910 in which notifications to the user are displayed, a collective gadget 920 having a button for commanding an collective operation of a plurality of the apparatuses or systems in the energy management system 1, a graph gadget 930 that displays the power consumption, power generation amount and power sales amount as graphs, a calendar gadget 940 that displays a calendar, a schedule gadget 950 that displays a schedule recorded by the user, and a layout gadget 960 that displays the installation locations of apparatuses or systems along with a layout of the dwelling.

In the notification gadget 910, events that occur in the energy management system 1, operation histories of the apparatuses or systems, notifications to the user and/or the like are displayed in chronological order. The controller 305 of the control device 120 generates data indicating notifications in accordance with the occurrence of events and or the like, and stores this data in the memory device 303.

Upon receiving a request from the user to display the management screen, the controller 305 displays the generated notifications in chronological order in the notification gadget 910.

Alternatively, when a request is received from the user to display the management screen, the controller 807 of the terminal device 40 acquires from the control device 120 notifications generated by the control device 120 and displays the acquired notifications in chronological order in the notification gadget 910.

The controller 305 may display a confirmation button 911 for each generated notification and prompt the user to read the notifications. For example, the controller 305 may display in a first color an unread notification for which the confirmation button 911 has not been pressed, and when the confirmation button 911 is pressed, may erase the confirmation button and display the read notification in a second color that differs from the first color.

Any number of notifications may be displayed in the notification gadget 910. When there are a large number of notifications, the controller 305 may display only a predetermined number of the newest notifications, or may display the large number of notifications in a scroll display with a scroll bar.

When there is a plurality of notifications generated by the control device 120, the controller 305 of the control device 120 or the controller 807 of the terminal device 40 extracts, from among the plurality of notifications, a predetermined number of the newest notifications (or not more than the predetermined number of the newest notifications) that have been most recently generated, and displays the extracted newest notifications in the notification gadget 910.

When the user touches any position within the display region of the notification gadget 910 (excluding the display region of the confirmation button 911), the controller 305 of the control device 120 or the controller 807 of the terminal device 40 causes a transition to a detail screen that displays a list of notifications generated to that point.

The collective gadget 920 includes collective manipulation buttons for commanding the collective operation of a plurality of apparatuses or systems. For example, a "departure" button 921 is associated with a command to turn off the power supplies of all lightings, all air conditioners and all television receivers in the dwelling, and when this departure button 921 is pressed by the user, the controller 305 causes the power supplies of all lightings, all air conditioners and all television receivers in the dwelling to turn off.

Alternatively, when the user presses the departure button 921, the controller 807 of the terminal device 40 sends a command to turn off the power supplies of all lightings, all air conditioners and all television receivers in the dwelling to the control device 120. The controller 305 of the control device 120 that has received this command causes the power supplies of all lightings, all air conditioners and all television receivers in the dwelling to turn off.

Specifically, examples of the collective manipulation buttons include, in addition to the above-described departure button 921, a button associated with a command that causes collective operation of a plurality of apparatuses or systems when the user arrives home, a button associated with a command that causes collective operation of a plurality of apparatuses or systems when the user goes to bed, a button associated with a command that causes collective operation of a plurality of apparatuses or systems when the user arises, a button associated with a command that causes collective operation of a plurality of apparatuses or systems on holidays, a button associated with a command that causes collective operation of a plurality of apparatuses or systems when there are visitors, a button associated with a command that causes collective operation of a plurality of apparatuses or systems when the user is travelling, and/or the like.

In addition, the user may freely define the process contents associated with a collective manipulation button. The controller 807 can receive from the user input of the name associated with a collective manipulation button, the apparatuses or systems associated with the collective manipulation button, process contents associated with the collective manipulation button and/or the like, and can store this information defined by the user in the memory device 806. The controller 807 displays the collective gadget 920 on the basis of the information stored in the memory device 806.

Any commands may be associated with the collective manipulation buttons arranged in the collective gadget 920. The user can freely alter commands associated with the collective manipulation buttons. The user can optionally alter, delete and add commands associated with the collective manipulation buttons, in accordance with the layout, the arrangement of apparatuses or systems, personal circumstances and/or the like.

When the number of possible patterns of collective manipulation exceeds the number of buttons displayable in the collective gadget 920, the controller 305 of the control device 120 or the controller 807 of the terminal device 40 limits the number of collective manipulation patterns to not more than the number that can be displayed in the collective gadget 920, and then displays the collective manipulation buttons. For example, when there are 10 collective manipulation patterns set by the user but the number of buttons that can be displayed in the collective gadget 920 is six so all cannot be displayed, the controller 305 of the control device 120 or the controller 807 of the terminal device 40 displays the six collective manipulation buttons with the highest frequency of use by the user.

In the graph gadget 930, the amount of power generated, the amount of power consumed and the amount of power sold by the entirety of the energy management system 1 are graphed and displayed. The controller 305 acquires in real time the amount of power generated by the power generating system 108, the amount of power stored by the power storage system 109, the amount of power stored by the electric vehicle 110 and the amount of power consumed as measured by a power measurement device. Furthermore, the controller 305, upon receiving from the user a request to display the management screen, graphs and displays in the graph gadget 930 the acquired amount of power generated, amount of power consumed and amount of power sold for the entirety of the energy management system 1.

Or, the controller 807 of the terminal device 40, upon receiving from the user a request to display the management screen, acquires the amount of power generated, the amount of power consumed and the amount of power sold for the entirety of the energy management system 1 from the control device 120, and displays this information in the graph gadget 930.

When the user touches any position in the display region of the graph gadget 930, the controller 305 of the control device 120 or the controller 807 of the terminal device 40 causes a transition to a screen that displays in more detail changes and/or the like in the amount of power generated, the amount of power consumed and the amount of power sold during the most recent several days, for example.

The controller 305 acquires periodically or in real time the amount of power generated, the amount of power consumed and the amount of power sold for the entirety of the energy management system 1, and stores the information as histories in the memory device 303. For example, the controller 305 stores in the memory device 303 the histories of a predetermined period such as the most recent three months. The controller 305 of the control device 120 or the controller 807 of the terminal device 40 extracts and displays on the graph gadget 930 the most recent history whose storage date and time is closest to the present date and time, from among all these histories.

In the calendar gadget 940, the date and time clocked by the control device 120 (system date and time) is displayed. Upon receiving from the user a request to display the management screen, the controller 305 displays the clocked date and time in the calendar gadget 940.

Alternatively, upon receiving from the user a request to display the management screen, the controller 807 of the terminal device 40 acquires the date and time clocked by the control device 120 and displays the acquired date and time in the calendar gadget 940.

When the user touches the display region of the calendar gadget 940, the controller 305 of the control device 120 or the controller 807 of the terminal device 40 causes a transition to a screen with which the user can alter the system date and time.

Furthermore, the controller 305 of the control device 120 or the controller 807 of the terminal device 40 may arrange in the calendar gadget 940 a button 941 for setting an alarm to sound at any date and time set by the user. Moreover, when the button 941 is on and a date and time is specified, the controller 305 of the control device 120 may output an alarm sound when the set date and time is reached, thereby notifying the user. Instead of the controller 305 of the control device 120, the controller 807 of the terminal device 40 may output an alarm sound when the set date and time is reached, thereby notifying the user of the terminal device 40.

In the schedule gadget 950, schedules recorded in the schedule table 700 shown in FIG. 7 are displayed. Upon receiving from the user a request to display the management screen, the controller 305 displays in the schedule gadget 950 a predetermined number of schedules in order from the scheduled date and time closest to the present date and time, from among the schedules recorded in the schedule table 700.

Alternatively, upon receiving from the user a request to display the management screen, the controller 807 of the terminal device 40 acquires from the control device 120 a predetermined number of schedules in order from the scheduled date and time closest to the present date and time, from among the schedules recorded in the schedule table 700, and displays the acquired schedules in the schedule gadget 950.

When there are a number of schedules recorded in the schedule table 700, the controller 305 of the control device 120 or the controller 807 of the terminal device 40 extracts, from among the number of schedules, a predetermined number of schedules (or not more than the predetermined number of schedules) having the newest scheduled dates and times, and displays the extracted schedules in the schedule gadget 950.

In the layout gadget 960, a layout diagram, in which images indicating the apparatuses or systems controllable by the control device 120 are arranged roughly in installation locations thereof, is displayed. Upon receiving from the user a request to display the management screen, the controller 305 of the control device 120 or the controller 807 of the terminal device 40 arranges the images of the apparatuses or systems in the layout diagram of the dwelling and displays such data in the layout gadget 960.

The images indicating the apparatuses or systems serve as buttons used for sending remote control commands to the corresponding apparatuses and systems, and when the user touches a button, the controller 305 of the control device 120 causes a transition to a screen for inputting contents of remote control (for example, in the case of an air conditioner, turning on or off the power supply, altering temperature settings and/or the like), and receives from the user remote control commands. The controller 305 of the control device 120 controls an apparatus or system corresponding to the touched image in accordance with the remote control commands input.

Alternatively, the controller 807 of the terminal device 40 receives remote control commands from the user and transmits the received remote control commands to the control device 120. The controller 305 of the control device 120 that received the remote control commands controls apparatuses or systems in accordance with the received remote control commands.

When there is ancillary information such as the operation status of apparatuses or systems, events that occurred in apparatuses or systems, notifications to the user and/or the like, the controller 305 of the control device 120 or the controller 807 of the terminal device 40 may display the ancillary information in association with the apparatuses or systems in the layout gadget 960.

When there are a large number of rooms and the entirety of the layout cannot be displayed in the layout gadget 960, or when the layout diagram becomes small during an attempt to display the entirety of the layout, making it difficult for the user to see, the controller 305 of the control device 120 or the controller 807 of the terminal device 40 may extract at least one room from among all rooms in the dwelling and display a portion of the entirety of the layout. Moreover, when the total number of apparatuses or systems included in the energy management system 1 is large and displaying all the apparatuses or systems in the layout gadget 960 is difficult, the controller 305 of the control device 120 or the controller 807 of the terminal device 40 may extract at least one apparatus or system from among all the apparatuses or systems and display in the layout gadget 960 images indicating at least one apparatus or system among all apparatuses or systems.

When the user touches an area that is within the display region of the layout gadget 960 and in which no image of an apparatus or system is displayed, the controller 305 of the control device 120 or the controller 807 of the terminal device 40 causes a transition to a screen showing a more detailed layout. For example, the controller 305 of the control device 120 or the controller 807 of the terminal device 40 transitions to a screen that allows, on the basis of instructions from the user, enlargement of a room selected by the user or alternation of the position of the virtual viewpoint for viewing the dwelling or the orientation of the virtual line of sight.

Update buttons 912, 922, 932, 942, 952 and 962 for updating the corresponding display contents to the latest contents are arranged in each gadget. When an update button is pressed, the controller 305 of the control device 120 immediately updates and displays the display contents of the corresponding gadget. Alternatively, when an update button is pressed, the controller 807 of the terminal device 40 reacquires the display contents of the corresponding gadget from the control device 120, and displays the contents.

When an update button 982 for updating the display contents in all gadgets to the latest contents is pressed, the controller 305 of the control device 120 immediately updates and displays the display contents of all the gadgets. Alternatively, when the update button 982 is pressed, the controller 807 of the terminal device 40 reacquires the display contents of all the gadgets from the control device 120, and displays the contents.

Regardless of whether or not any of the update buttons is pressed, the controller 305 of the control device 120 may automatically update the display contents in each gadget to the latest contents at predetermined time intervals and display such contents. Similarly, regardless of whether or not any of the update buttons is pressed, the controller 807 of the terminal device 40 may reacquire the display contents of each gadget from the control device 120 at predetermined time intervals, and display such contents.

The controller 305 of the control device 120 or the controller 807 of the terminal device 40 may display in each gadget or near each gadget the date and time at which the display of each gadget was most recently updated.

The controller 305 of the control device 120 or the controller 807 of the terminal device 40 may display the time remaining until the display in each gadget is updated next, in each gadget or near each gadget. That is to say, a "countdown" may be performed until the next update.

With the management screen configured as described above, the user can peruse, all at once, information such as summaries of various functions of the energy management system 1, operating statuses and/or the like. For example, when the power consumption amount and layout are displayed on completely separate screens and both cannot be simultaneously perused, there are concerns that the user cannot simultaneously compare the power consumption amount and the layout, and must frequently go back and forth between the screen showing the power consumption amount and the screen showing the layout. However, with this embodiment, the user can perform, in a single management screen, manipulation such as turning off the power supply of an air conditioner when the power consumption amount is large, while comparing the power consumption amount displayed on the graph gadget 930 and the layout displayed on the layout gadget 960. The energy management system 1 can provide a more easily manipulated management screen to the user.

Meanwhile, the gadgets may be displayed completely independent of each other, but in this embodiment, displays of the gadgets may be linked to each other. Below, examples of link of displays among the gadgets are shown.

(1) Example of Link Between the Notification Gadget 910 and the Layout Gadget 960

When a notification relating to a specific apparatus or system is displayed on the notification gadget 910, the controller 305 of the control device 120 or the controller 807 of the terminal device 40 displays with emphasis the image indicating the apparatus or system associated with the notification, in the layout gadget 960.

Figure 10:
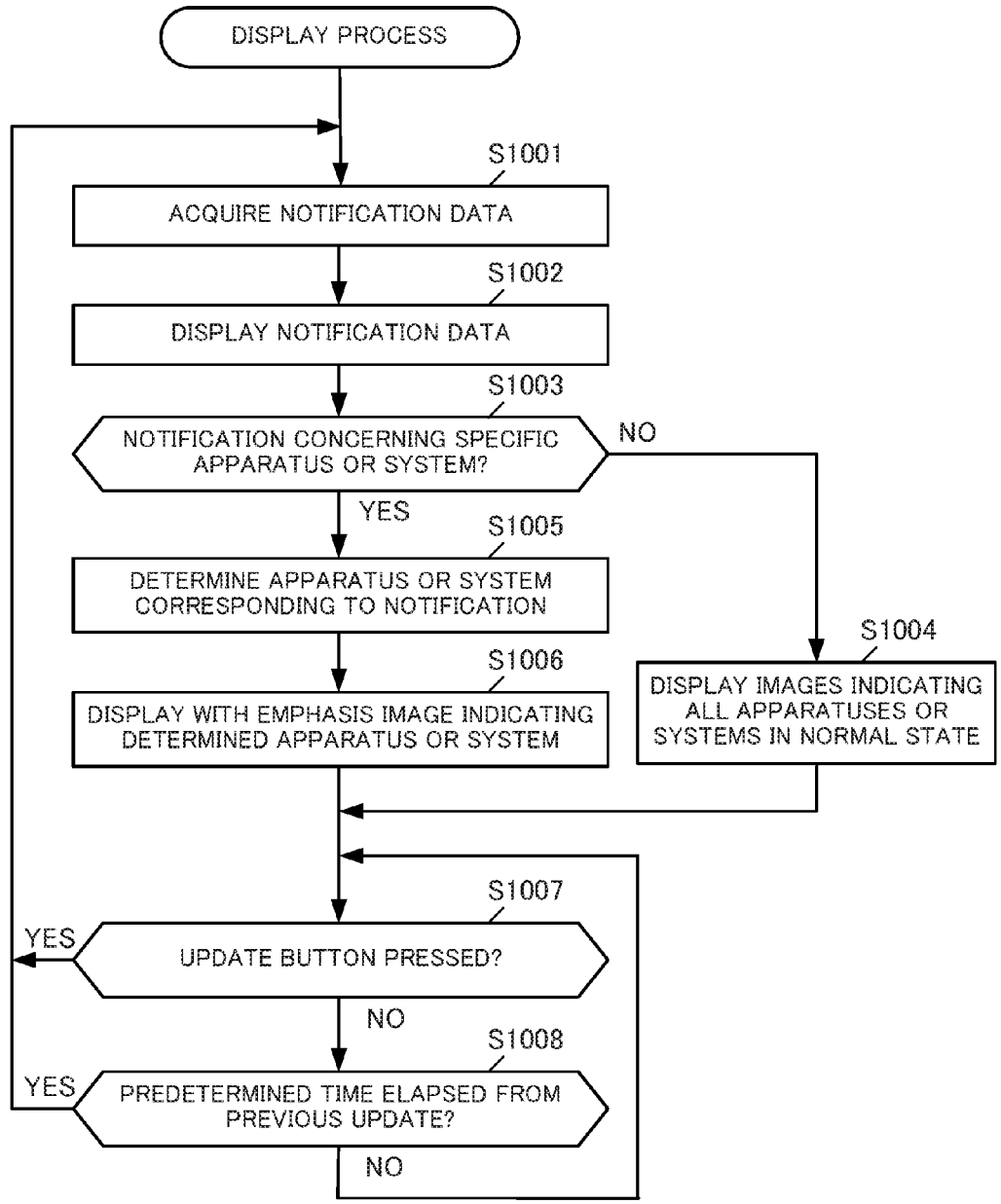
FIG. 10 is a flowchart for describing a display process in which a notification gadget and a layout gadget are linked to each other.

FIG. 10 shows a flowchart of a process for displaying the management screen, in which the notification gadget 910 and the layout gadget 960 are linked to each other. Here, a case in which the management screen is displayed by the terminal device 40 is described.

Figure 18:
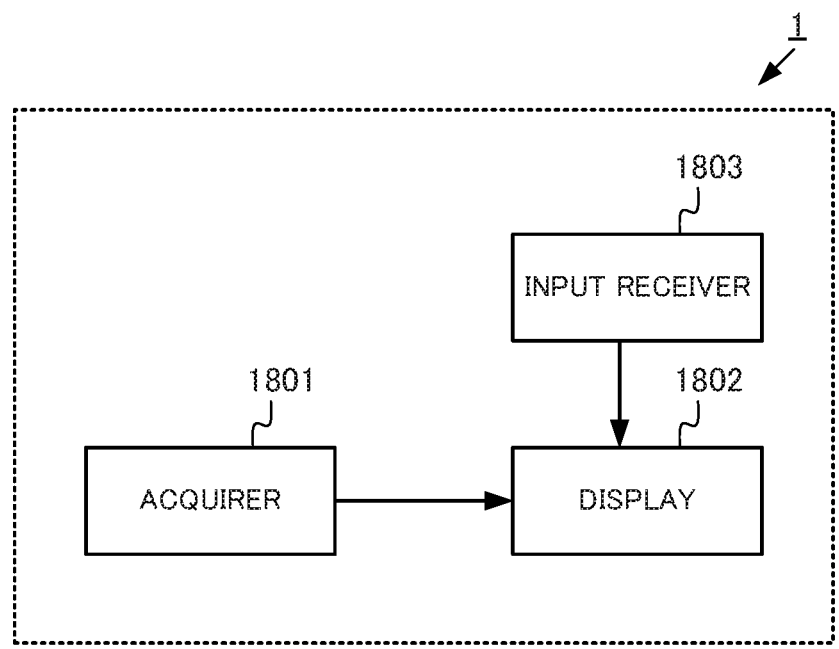
FIG. 18 is a drawing showing a functional configuration of the energy management system.

Furthermore, FIG. 18 shows a functional configuration of the energy management system 1 according to this embodiment.

First, the controller 807 acquires data indicating the notification to the user, from the control device 120 (step S1001). The controller 807 and the wireless communicator 801 work together to function as an acquirer 1801 that acquires the notification data indicating the notification to the user.

The controller 807 displays the acquired notification data in the notification gadget 910 (step S1002).

The controller 807 determines whether or not the acquired notification data relates to a specific apparatus or system (step S1003).

When the acquired notification data does not relate to the specific apparatus or system (step S1003: No), the controller 807 displays images indicating all of the apparatuses or systems in the layout gadget 960, in a normal state (step S1004). For example, when the acquired notification is not directly related to apparatuses or systems in the dwelling, such as "Mr. (Ms.) OO logged in", or is related to all of the apparatuses or systems, such as "the current total power consumption amount is OO kilowatts", images indicating all of the apparatuses or systems are displayed in a normal state without emphasis.

On the other hand, when the acquired notification data is related to the specific apparatus or system (step S1003: Yes), the controller 807 determines the apparatus or system associated with the notification (step S1005) and displays with emphasis an image indicating the determined apparatus or system, in the layout gadget 960 (step S1006). The controller 807 displays in a normal state images indicating the other apparatuses or systems that are not associated with the notification.

Specifically, the controller 807 of the terminal device 40 displays the image indicating the apparatus or system corresponding to the notification data in a relatively large size compared to the other images.

The controller 807 may also display the image indicating the apparatus or system associated with the notification data with a flashing display.

The controller 807 may display in the layout gadget 960 the same contents as the message displayed in the notification gadget 910 or summary of such contents, or notice that there is a notification, in association with the image indicating the apparatus or system corresponding to the notification data.

When there is a plurality of notification data items, the controller 807 determines whether or not the most newly generated notification data or the most newly acquired notification data relate to the specific apparatus or system.

In this manner, the controller 807 and the image processor 803 work together to function as a display 1802 that displays information indicating the notification data and the operating status of the specific apparatus in the notification gadget 910 (in the first display region), displays a layout diagram in the layout gadget 960 (in the second display region), and displays with relative emphasis an image indicating the determined apparatus or system.

The controller 807 determines whether or not the update button 912 of the notification gadget 910 or the update button 982 for updating the management screen as a whole has been pressed (step S1007). The inputter 805 and the controller 807, working together, function as an input receiver 1803 that receives an instruction to update the display.

When the update button 912 or the update button 982 has been pressed (step S1007: Yes), the process returns to step S1001 and the controller 807 updates the display of the notification gadget 910 or the management screen as a whole.

When neither the update button 910 nor the update button 982 has been pressed (step S1007: No), the controller 807 determines whether or not a predetermined time has elapsed after the notification gadget 910 was previously updated (step S1008).

When the predetermined time has elapsed (step S1008: Yes), the process returns to step S1001 and the controller 807 updates the display of the notification gadget 910. When the predetermined time has not elapsed (step S1008: No), the process returns to step S1007.

In this manner, by linking the display of the notification gadget 910 and the display of the layout gadget 960 to each other, the solicitation effect to the user is increased. In addition, the user can intuitively grasp which apparatus or system relates to the notification.

For example, when there is a message "the setting value of the living room air conditioning is abnormal", this message is displayed on the notification gadget 910, and in addition, an image indicating the air conditioner 102C in the layout gadget 960 is displayed with emphasis. The user perusing the management screen can grasp at a single glance that the apparatus that is the target of the message is the air conditioner 102C in the living room. Furthermore, by touching the image indicating the air conditioner 102C in the layout gadget 960 of the management screen, the user can confirm the current operating status and setting value of the air conditioner 102C and can appropriately manipulate the air conditioner 102C remotely.

(2) Example of Link Between Schedule Gadget 950 and the Layout Gadget 960

Figure 11:
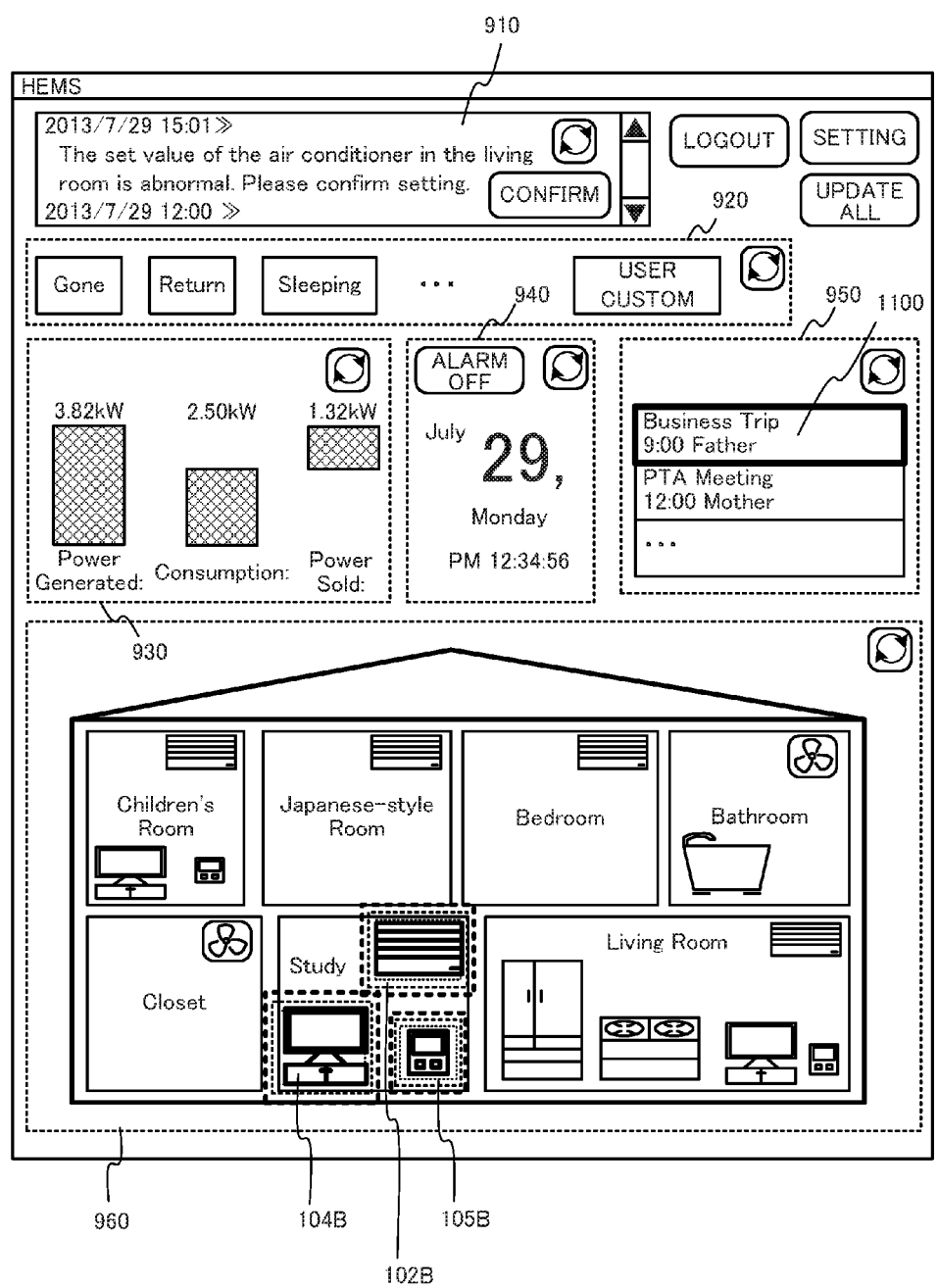
FIG. 11 is a drawing showing a configuration of a management screen.

When an instruction to cause an apparatus or system to operate in association with a schedule is recorded in the schedule table 700, the controller 305 of the control device 120 or the controller 807 of the terminal device 40 displays with emphasis an image indicating the apparatus or system associated with the target user of the schedule, in the layout gadget 960, as shown in FIG. 11.

Figure 12:
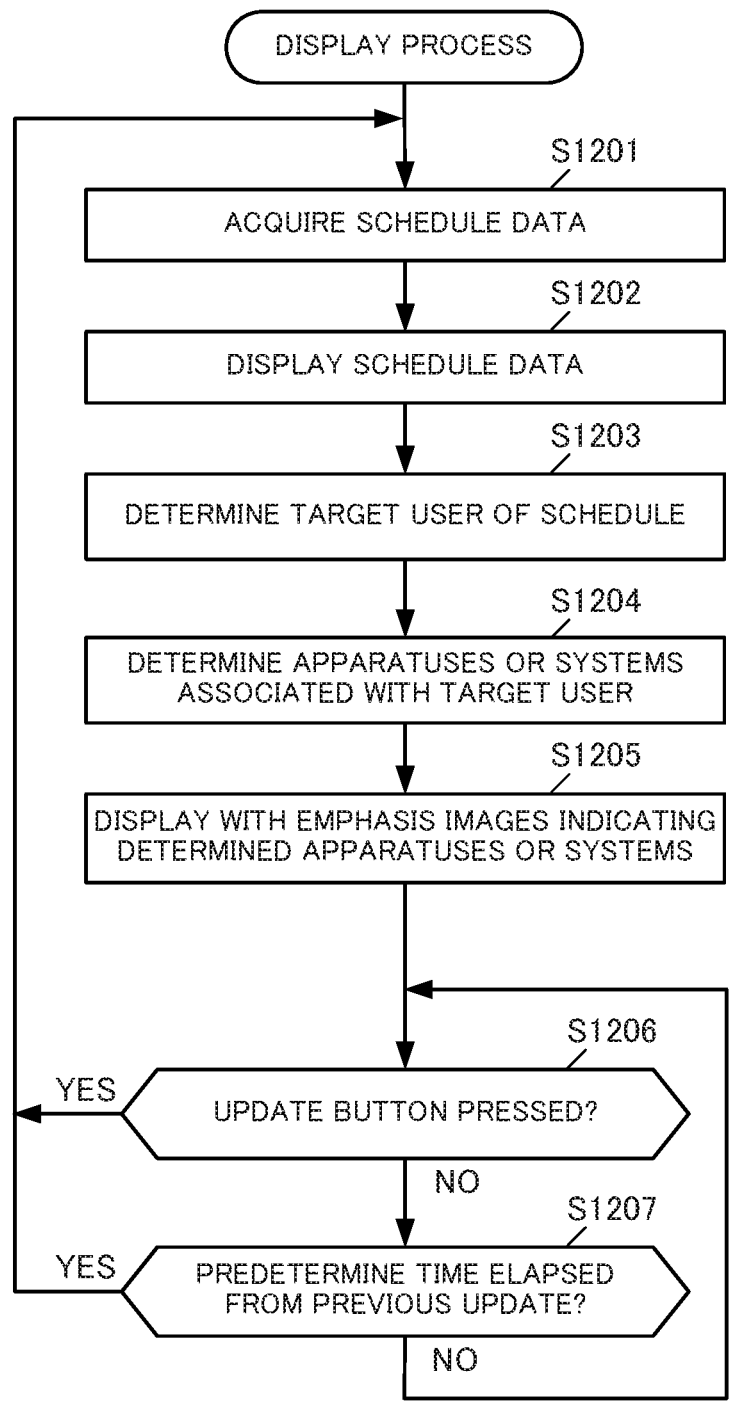
FIG. 12 is a flowchart for describing a display process in which a schedule gadget and a layout gadget are linked to each other.

FIG. 12 shows a flowchart of a process for displaying the management screen, in which the schedule gadget 950 and the layout gadget 960 are linked to each other. Here, a case is described in which the management screen is displayed by the terminal device 40.

First, the controller 807 acquires schedule data indicating a schedule recorded in the schedule table 700, from the control device 120 (step S1201). The controller 807 and the wireless communicator 801, working together, function as the acquirer 1801 that acquires information indicating the schedule.

The controller 807 displays the acquired schedule data in the schedule gadget 950 (step S1202).

The controller 807 determines the target user of the schedule, on the basis of the schedule table 700 (step S1203).

The controller 807 determines the room associated with the determined target user, on the basis of the room-user association table 600, and furthermore determines the apparatus or system associated with the determined room, on the basis of the apparatus-room association table 500. That is to say, the controller 807 determines the apparatus or system associated with the target user of the schedule (step S1204).

Then, the controller 807 displays with emphasis an image indicating the determined apparatus or system, in the layout gadget 960. (step S1205) The controller 807 displays, in a normal state, images indicating the other apparatuses or systems.

Specifically, the controller 807 displays the image indicating the apparatus or system associated with the schedule in a relatively large size compared to the other images.

The controller 807 may display the image indicating the apparatus or system associated with the target user of the schedule with a flashing display.

The controller 807 may display the same contents as the schedule displayed in the schedule gadget 950 or summary of such contents, or notice of the fact that the schedule is set, in association with the image indicating the apparatus or system corresponding to the target user of the schedule.

In this manner, the controller 807 and the image processor 803, working together, function as the display 1802 that displays notification data in the schedule gadget 950 (in the first display region), displays a layout diagram in the layout gadget 960 (in the second display region), and displays with relative emphasis an image indicating the determined apparatus or system.

The controller 807 determines whether or not the update button 952 of the schedule gadget 950 or the update button 982 for updating the management screen as a whole has been pressed (step S1206).

When the update button 952 or the update button 982 has been pressed (step S1206: Yes), the process returns to step S1201 and the controller 807 updates the display of the schedule gadget 950 or the management screen as a whole.

When neither the update button 952 nor the update button 982 has been pressed (step S1206: No), the controller 807 determines whether or not a predetermined time has elapsed after the schedule gadget 950 was previously updated (step S1207).

When the predetermined time has elapsed (step S1207: Yes), the process returns to step S1201 and the controller 807 updates the display of the schedule gadget 950. When the predetermined time has not elapsed (step S1207: No), the process returns to step S1206.

By linking the display of the schedule gadget 950 and the display of the layout gadget 960 to each other, the solicitation effect to the user is increased. In addition, the user can intuitively grasp which apparatus or system is associated with which schedule.

For example, when a schedule 1100, "the father leaves for work at 9:00", is included in the schedule table 700, and the father is associated with the "study" in the room-user association table 600, the controller 305 of the control device 120 or the controller 807 of the terminal device 40 further references the apparatus-room association table 500, specifies the apparatuses or systems associated with the study (in FIG. 11, the air conditioner 102B, the television receiver 104B and the floor heating system 105B) and displays with emphasis images indicating the specified apparatuses or systems 102B, 104B and 105B. Through this, a user perusing the management screen can easily grasp at a glance that "a schedule for 9:00 is set, and when 9:00 arrives, predetermined operations are performed by specified apparatuses or systems (for example, the power supply turns off)", before the schedule date and time arrives.

(3) Example of Link Between Collective Gadget 920 and Layout Gadget 960

Figure 13:
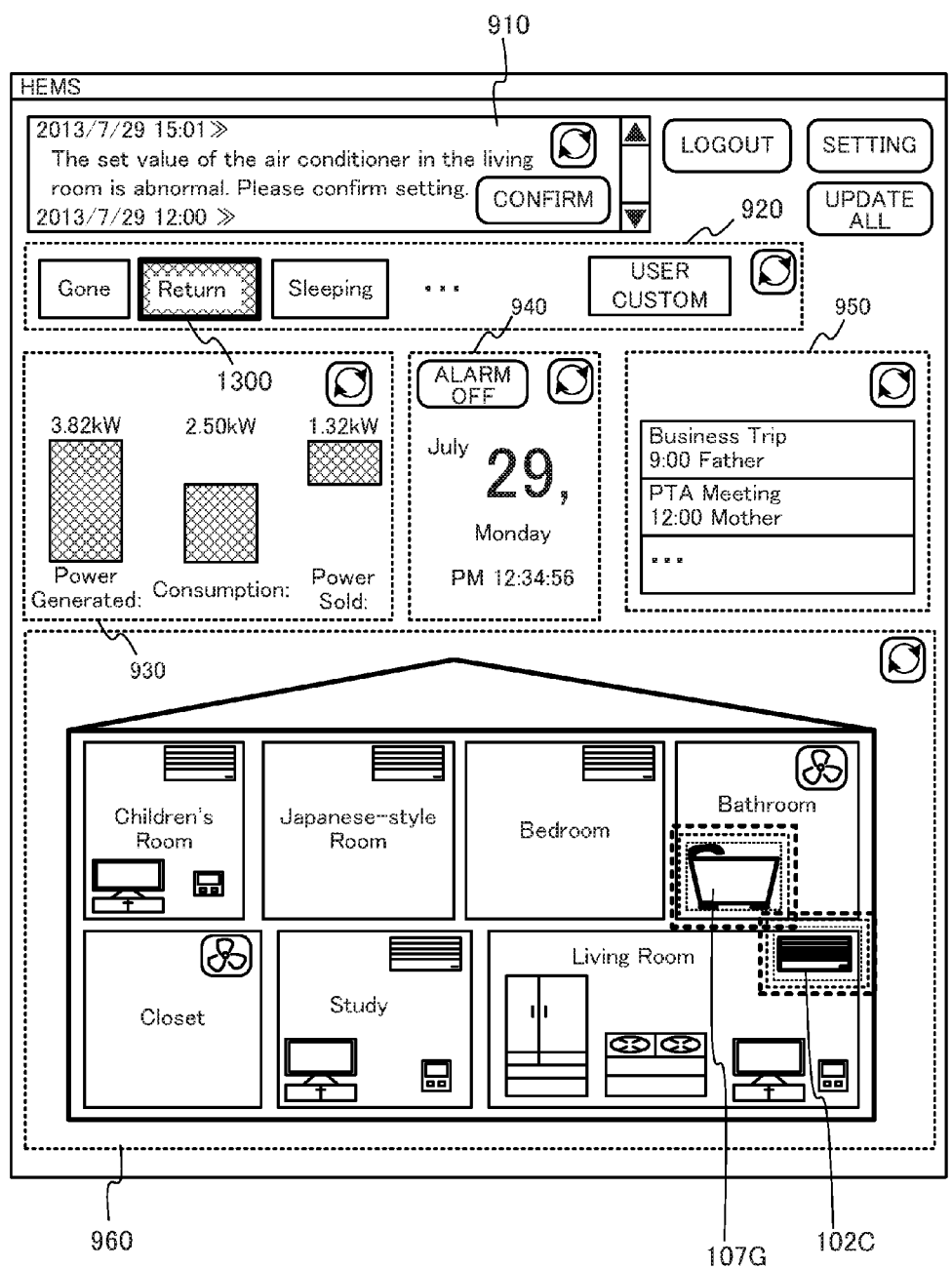
FIG. 13 is a drawing showing a configuration of a management screen.

When a button commanding a collective manipulation is pressed, the controller 305 of the control device 120 or the controller 807 of the terminal device 40 displays with emphasis images indicating apparatuses or systems that are targets of collective manipulation associated with the pressed button, in the layout gadget 960, as shown in FIG. 13.

Figure 14:
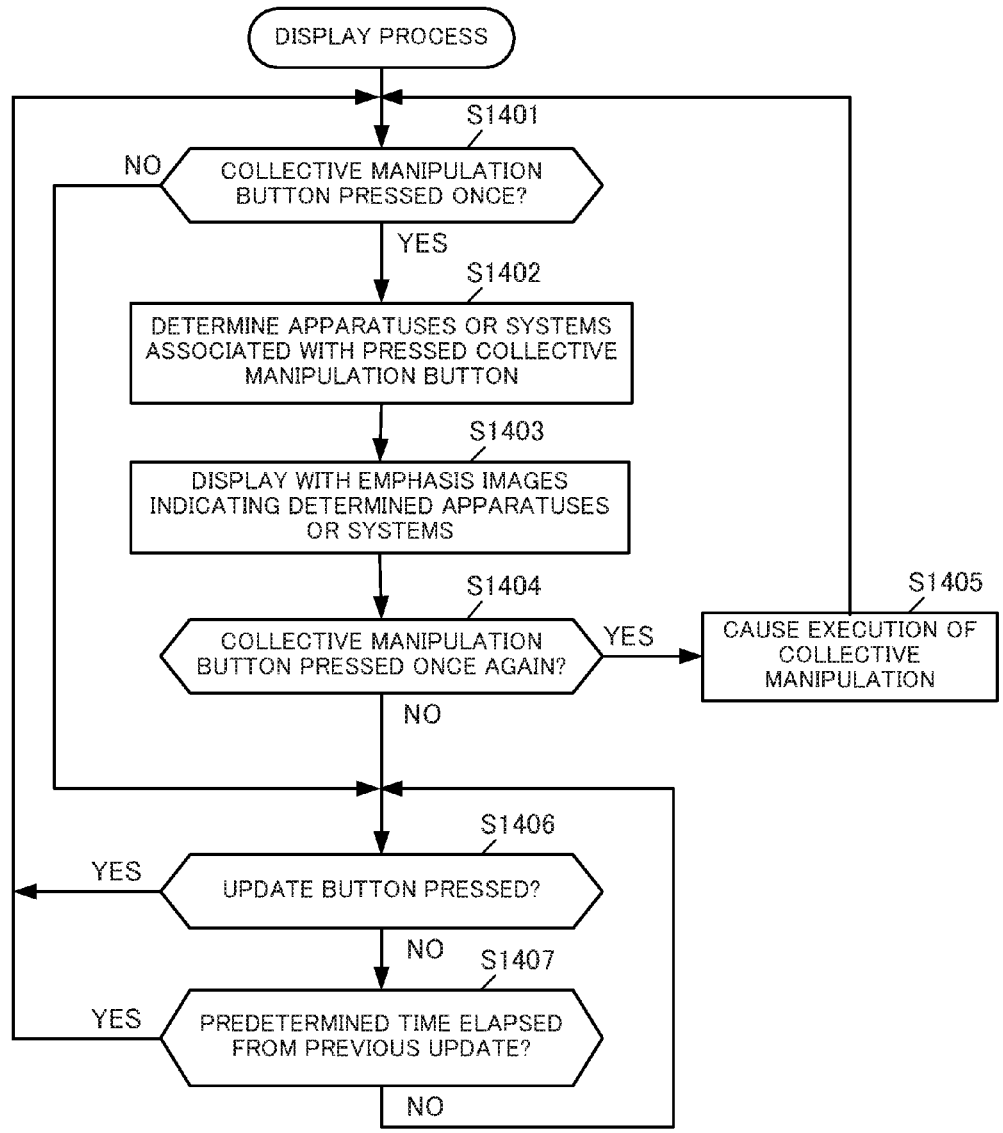
FIG. 14 is a flowchart for describing a display process in which a collective gadget and a layout gadget are linked to each other.

FIG. 14 shows a flowchart of a process for displaying the management screen, in which the collective gadget 920 and the layout gadget 960 are linked to each other. Here, a case in which the management screen is displayed by the terminal device 40 is described.

First, the controller 807 determines whether or not the collective manipulation button was pressed one time by the user (step S1401).

When the collective manipulation button was not pressed even one time by the user (step S1401: No), the controller 807 moves the process to step S1406.

When the collective manipulation button has been pressed one time by the user (step S1401: Yes), the controller 807 determines the apparatuses or systems associated with the collective manipulation button that was pressed (step S1402). The controller 807 and the wireless communicator 801, working together, function as the acquirer 1801 that acquires collective operation information for causing a plurality of apparatuses or systems to perform a predetermined operation all together.

The controller 807 displays with emphasis images indicating the apparatuses or systems determined in step S1402, in the layout gadget 960 (step S1403). The controller 807 displays, in a normal state, images indicating the other apparatuses or systems.

Specifically, the controller 807 displays the images indicating the apparatuses or systems associated with the button commanding collective manipulation in a relatively large size compared to the other images.

The controller 807 may also display the images indicating the apparatuses or systems associated with the button commanding the collective manipulation with a flashing display.

The controller 807 may display, in association with the images indicating the apparatuses or systems associated with the button commanding the collective manipulation, instruction contents through collective manipulation or notice that the apparatuses or systems are setting targets of the collective manipulation.

In this manner, the controller 807 and the image processor 803, working together, function as the display 1802 that displays a button for commanding collective control in the collective gadget 920 (in the first display region), displays a layout diagram in the layout gadget 960 (in the second display region) and displays with relative emphasis the images indicating the determined apparatuses or systems.

Furthermore, the controller 807 determines whether or not the collective manipulation button has again been pressed one time by the user (step S1404).

When the collective manipulation button has again been pressed one time by the user (step S1404: Yes), the controller 807 sends to the control device 120 a command associated with the collective manipulation button that was pressed, causes the control device 120 to execute collective manipulation (step S1405) and then returns to step S1401.

The controller 807 determines whether or not the update button 922 of the collective gadget 920 or the update button 982 for updating the management screen as a whole has been pressed (step S1406).

When the update button 922 or the update button 982 has been pressed (step S1406: Yes), the process returns to step S1401 and the controller 807 updates the display of collective gadget 920 or the management screen as a whole.

When neither the update button 922 nor the update button 982 has been pressed (step S1406: No), the controller 807 determines whether or not a predetermined time has elapsed after the collective gadget 920 was previously updated (step S1407).

When the predetermined time has elapsed (step S1407: Yes), the process returns to step S1401 and the controller 807 updates the display of the collective gadget 920. When the predetermined time has not elapsed (step S1407: No), the process returns to step S1406.

By linking the display of the collective gadget 920 and the display of the layout gadget 960 to each other, the solicitation effect to the user is increased. Furthermore, the user can intuitively grasp which apparatuses or systems are associated with the button commanding collective manipulation, and which apparatuses or systems are to undergo collective manipulation.

For example, in a case where the command "cause the hot-water supply system 107G in the bathroom to begin supplying hot water to the bathtub, and turn on cooling by the air conditioner 102C of the living room" is associated with a collective manipulation button 1300, when the collective manipulation button 1300 is pressed, the controller 305 of the control device 120 or the controller 807 of the terminal device 40 specifies apparatuses or systems that are the target of instructions by the collective manipulation button 1300 (in FIG. 13, the hot-water supply system 107G and the air conditioner 102C), and displays with emphasis images indicating the specified apparatuses or systems 107G and 102C. Through this, a user who peruses the management screen can easily grasp at a glance that commands giving collective instructions to the hot-water supply system 107G and the air conditioner 102C are associated with the collective manipulation button 1300, prior to pressing the collective manipulation button 1300.

When the collective manipulation button 1300 has been pressed once (single tapped), the controller 305 of the control device 120 or the controller 807 of the terminal device 40 displays the collective gadget 920 and the layout gadget 960 in a mutually linked manner as described above, and when the collective manipulation button 1300 is pressed twice in a row (double tapped), executes the command associated with the collective manipulation button 1300.

(4) Example of Link Between the Graph Gadget 930 and the Layout Gadget 960

Figure 15:
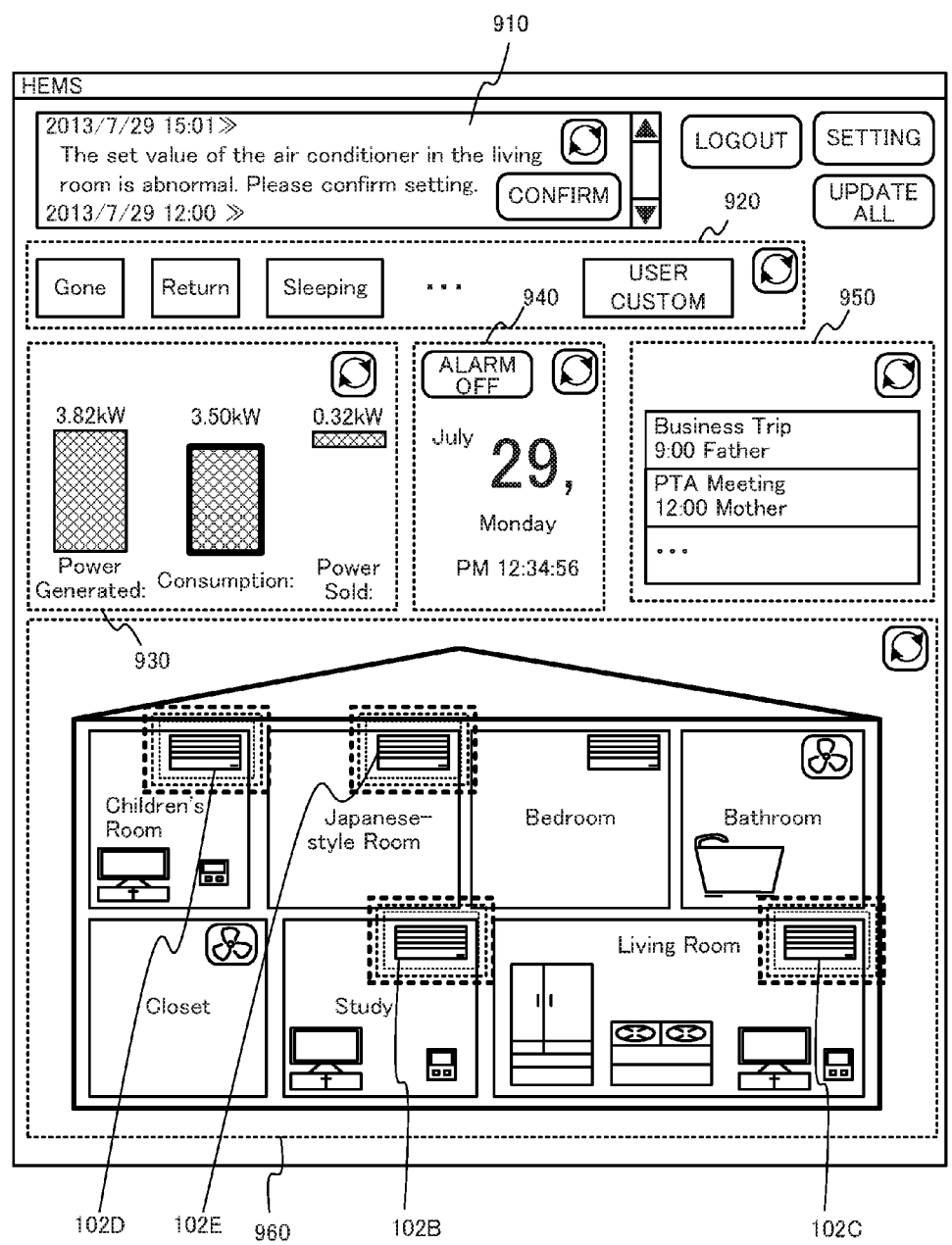
FIG. 15 is a drawing showing a configuration of a management screen.

When the power consumption amount of the energy management system 1 as a whole is larger than a predetermined threshold value, the controller 305 of the control device 120 or the controller 807 of the terminal device 40 displays in the layout gadget 960 images indicating the apparatuses or systems with relatively large individual power consumption amounts, with emphasis, as shown in FIG. 15.

Figure 16:
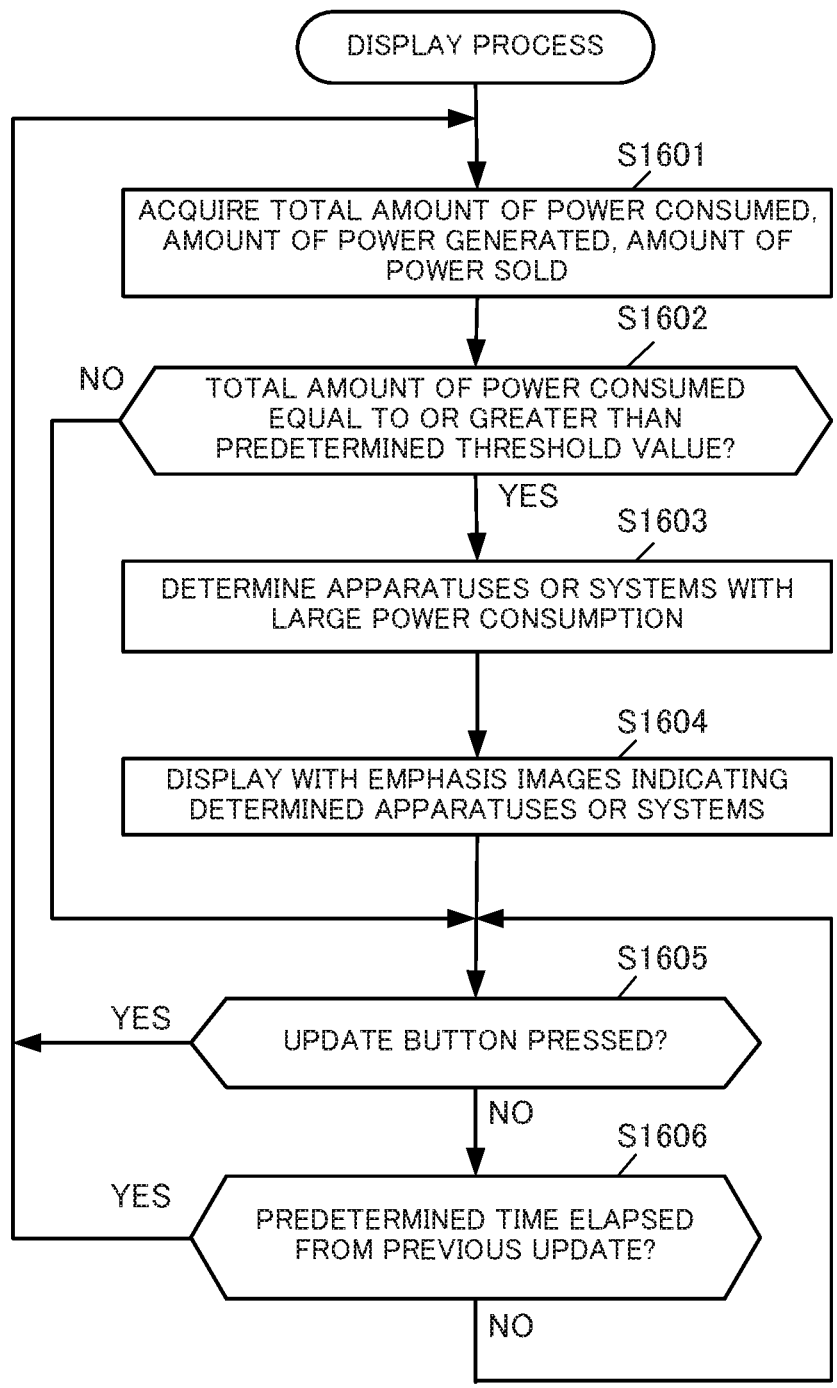
FIG. 16 is a flowchart for describing a display process in which a graph gadget and a layout gadget are linked to each other.

FIG. 16 shows a flowchart of a process for displaying the management screen, in which the graph gadget 930 and the layout gadget 960 are linked to each other. Here, a case in which the management screen is displayed by the terminal device 40 is described.

First, the controller 807 acquires the amount of power generated by the power generating system 108, and the total amount of power consumed, the amount of power generated and the amount of power sold for the energy management system 1 as a whole (step S1601). The controller 807 and the wireless communicator 801, working together, function as the acquirer 1801 that acquires data indicating the total amount of power consumed, the amount of power generated, the amount of power sold, and/or the like.

The controller 807 determines whether or not the acquired total amount of power consumed is equal to or greater than a predetermined threshold value (step S1602).

When the acquired total amount of power consumed is less than the predetermined threshold value (step S1602: No), the controller 807 moves the process to step S1605. On the other hand, when the acquired total amount of power consumed is equal to or greater than the predetermined threshold value (step S1602: Yes), the controller 807 determines a predetermined number of apparatuses or systems having large amounts of power consumed, from among all apparatuses or systems controlled by the control device 120 (step S1603). That is to say, a predetermined number of apparatuses or systems are determined in order from those with the greatest contribution to the total amount of power consumed.

The controller 807 displays with emphasis images indicating the determined apparatuses or systems (step S1604). The controller 807 displays in a normal state images indicating the other apparatuses or systems.

Specifically, the controller 807 displays the images indicating the predetermined number of apparatuses or systems in descending order of the amount of power consumed, in a relatively large size compared to the other images.

The controller 807 may also display the images indicating the predetermined number of apparatuses or systems in descending order of the amount of power consumed, with a flashing display.

When the amount of power consumed reaches at least a predetermined ratio of the amount of power generated, without the total amount of power consumed being greater than the predetermined threshold value, or when the total amount of power consumed per unit time is greater than a predetermined value, the controller 807 may display with emphasis images indicating apparatuses or systems with the greatest individual amounts of power consumed.

Moreover, the controller 807 may display with emphasis images indicating the apparatuses or systems each having a power consumption amount equal to or greater than a predetermined threshold value, instead of displaying with emphasis images indicating a predetermined number of apparatuses or systems in descending order of the power consumption amount.

Any number of images may be used to indicate the above-described predetermined number of apparatuses or systems, that is to say those displayed with emphasis. The predetermined number is set by the user or the controller 305.

In this manner, the controller 807 and the image processor 803, working together, function as the display 1802 that displays information indicating the total amount of power consumed and/or the like in the graph gadget 930 (in the first display region), displays a layout diagram in the layout gadget 960 (in the second display region) and displays with relative emphasis images indicating the determined apparatuses or systems.

The controller 807 determines whether or not the update button 932 of the graph gadget 930, or the update button 982 for updating the management screen as a whole, has been pressed (step S1605).

When the update button 932 or the update button 982 has been pressed (step S1605: Yes), the process returns to step S1601 and the controller 807 updates the display of the graph gadget 930 or the management screen as a whole.

When neither the update button 932 nor the update button 982 has been pressed (step S1605: No), the controller 807 determines whether or not a predetermined time has elapsed after the graph gadget 930 was previously updated (step S1606).

When the predetermined time has elapsed (step S1606: Yes), the process returns to step S1601 and the controller 807 updates the display of the graph gadget 930. When the predetermined time has not elapsed (step S1606: No), the process returns to step S1605.

By linking the display of the graph gadget 930 and the display of the layout gadget 960 to each other, the solicitation effect to the user is increased. Furthermore, the user can not only know that the power consumption amount of the energy management system 1 as a whole is large, but can also intuitively grasp which apparatuses or systems have large power consumption amounts.

For example, in a case in which the user is to be warned of overuse of electricity when the total amount of power consumed reaches 90% or more of the amount of power generated by the power generating system 108, the controller 305 of the control device 120 or the controller 807 of the terminal device 40 displays, in a relatively large size compared to the other images, images indicating apparatuses or systems (in FIG. 15, the four air conditioners 102B, 102C, 102D and 102E) having relatively large power consumption amounts when the total amount of power consumed reaches 90% or more of the amount of power generated. Through this, a user perusing the management screen can easily grasp that electric is being overused, and can grasp at a glance that curtailing use of which apparatuses or systems will be most effective in reducing the total amount of power consumed.

The controller 305 of the control device 120 or the controller 807 of the terminal device 40 may constantly display with emphasis images indicating a predetermined number of apparatuses or systems with large contributions to the total amount of power consumed, regardless of the total amount of power consumed.

With this embodiment, the energy management system 1 can provide a user with a management screen in which it is easy to grasp the relationship among items of information, by causing displays in each of the gadgets to be linked to each other. The user can simultaneously acquire various items of information from a single management screen, can input various instructions from a single management screen and can easily grasp connections among the items of information.

In each of the above-described management processes, a case in which the management screen is displayed by the terminal device 40 was described, but the same processes are performed in a case in which the management screen is displayed by the control device 120.

Second Embodiment

Next, a second embodiment is described. In this embodiment, automatic update timings of the gadgets are linked to each other.

Figure 17:
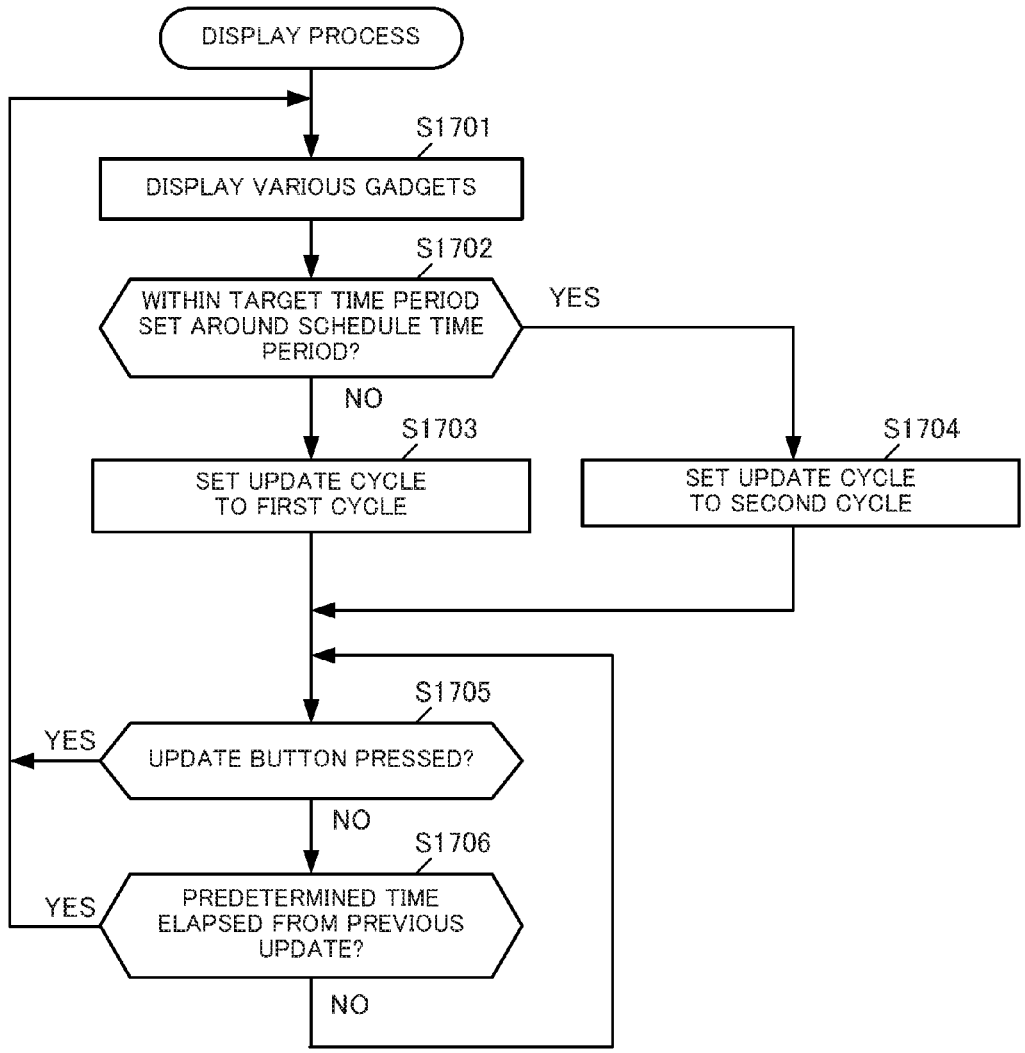
FIG. 17 is a flowchart for describing a display process in which update timings are linked to each other.

FIG. 17 shows a flowchart of a process for displaying the management screen, in which the update timings of the various gadgets are linked to each other. Here, a case is described in which the management screen is displayed by the terminal device 40.

First, the controller 807 displays the management screen including the gadgets 910, 920, 930, 940, 950 and 960 (step S1701).

The controller 807 determines whether or not the current date and time is within a target period set around a schedule period recorded in the schedule table 700 (step S1702).

The target time period is predetermined as being from a first time prior to the execution date and time of the schedule to a second time after the execution date and time of the schedule. The first time and the second time may be set to have any length. For example, when the first time is defined as "5 minutes", the second time is defined as "10 minutes" and the execution date and time of the schedule is "12:00", the target time period is "from 11:55 to 12:10".

When the current date and time is not within the above-described target period (step S1702: No), the controller 807 sets the update cycle to a first cycle and starts a timer (step S1703). This timer is used to determine whether or not the update timing of the management screen has arrived.

When the current date and time is within the above-described target period (step S1702: Yes), the controller 807 sets the update cycle to a second cycle (step S1704) and starts the timer.

The second cycle is shorter than the first cycle. That is to say, when the current date and time becomes close to the execution date and time of the schedule, the update frequency of the management screen increases.

The controller 807 determines whether or not the update button 912, 922, 932, 942, 952 or 962 of any of the gadgets, or the update button 982 for updating the management screen as a whole, has been pressed (step S1705).

When any of the update buttons 912, 922, 932, 942, 952, 962 and 982 has been pressed (step S1705: Yes), the process returns to step S1701 and the controller 807 updates the display of the associated gadget or the management screen as a whole.

When none of the update buttons 912, 922, 932, 942, 952, 962 and 982 has been pressed (step S1705: No), the controller 807 determines whether or not a predetermined time has elapsed after the management screen as a whole was previously updated (step S1706).

When the predetermined time has elapsed (step S1706: Yes), the process returns to step S1701 and the controller 807 updates the display of the management screen. When the predetermined time has not elapsed (step S1706: No), the process returns to step S1705).

The controller 807 may cause the update cycles of the gadgets to differ from each other, or may make them uniform.

Furthermore, the controller 807 may change only the update cycles of gadgets that are readily influenced by the process executed by the recorded schedule, for example, the notification gadget 910, the graph gadget 930 and the layout gadget 960.

With this embodiment, the update timing changes in accordance with the schedule, so it is easy for the user to promptly know the influence of scheduled processes and the results of processes, thereby increasing the real-time nature of the display of the management screen.

The present disclosure is not limited to the above-described embodiments, and various variations and applications are possible. It is also possible to freely combine the various constituent elements of the above-described embodiments.

A program that causes a computer to operate as the above-described energy management system 1 as a whole or in part may be stored and distributed on a non-transitory computer-readable recording medium such as a memory card, CD-ROM, DVD, magneto optical (MO) disk and/or the like, installed on a different computer and caused to operate as the above-described means or to execute the above-described procedures.

Furthermore, the program may be stored on a disk device and/or the like of a server device on the Internet, and for example, may be overlaid on carrier waves and downloaded to a computer and/or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Thus, with the above-described embodiments, it is possible to provide to a user a management screen in which the relationship among items of information can easily be grasped.

This application claims the benefit of Japanese Patent Application No. 2013-164231, the entire disclosure of which is incorporated by reference herein.

REFERENCE SIGNS LIST

1 Energy management system
10 Inside network
20 Outside network
30 Server
40 Terminal device
50 Communication network
101 Independent switching board
102 Air conditioner
103 Ventilation system
104 Home appliances
105 Floor heating system
106 IH cooking heater
107 Hot-water supply system
108 Power generating system
109 Power storage system
110 Electric vehicle
120 Control device
301 Inputter
302 Display
303 Memory device
304 Communicator
305 Controller
400 Layout definition table
500 Apparatus-room association table
600 Room-user association table
700 Schedule table
801 Wireless communicator
802 Audio processor
803 Image processor
804 External interface
805 Inputter
806 Memory device
807 Controller
821 Speaker
822 Microphone
823 LCD
824 Touch panel
910 Notification gadget
920 Collective gadget
930 Graph gadget
940 Calendar gadget
950 Schedule gadget
960 Layout gadget
1801 Acquirer
1802 Display
1803 Input receiver

The invention claimed is:

1. An energy management system for controlling a plurality of apparatuses installed in a dwelling, the energy management system comprising:
an acquirer configured to acquire information concerning the energy management system; and
a display configured to display, in a first display region, the information acquired by the acquirer, and to display, in a second display region, a layout diagram in which images indicating the plurality of apparatuses are arranged at positions corresponding to installation locations of the plurality of apparatuses in the dwelling,
wherein the display is configured:
to display, when the information displayed in the first display region includes information concerning a specific apparatus among the plurality of apparatuses, an image indicating the specific apparatus in the second display region with relative emphasis; and to update, at a date and time that is not included in a target period, display in the first display region and display in the second display region with a first cycle, and to update, at a date and time that is included in the target period, the display in the first display region and the display in the second display region with a second cycle that is shorter than the first cycle, wherein the target period includes a first period that ends at a date and time set by a user and a second period that starts at the date and time set by the user.

2. The energy management system according to claim 1, wherein:
   the information concerning the energy management system includes information indicating an operation status of the specific apparatus; and
   the display is configured to display, in the first display region, the information indicating the operation status of the specific apparatus, and to display, in the second display region, the layout diagram configured to emphasize the image indicating the specific apparatus.

3. The energy management system according to claim 1, wherein:
   the information concerning the energy management system includes information indicating a schedule for causing the specific apparatus to perform a predetermined operation at the date and time set by the user; and
   the display is configured to display the schedule in the first display region, and to display, in the second display region, the layout diagram configured to emphasize the image indicating the specific apparatus that performs the predetermined operation in accordance with the schedule.

4. The energy management system according to claim 1, wherein:
   the information concerning the energy management system includes collective operation information indicating an instruction to cause a plurality of the specific apparatuses to perform a predetermined operation all together; and
   the display is configured to display, in the first display region, a button configured to receive from the user the instruction to cause the plurality of the specific apparatuses to perform the predetermined operation all together, and to display, in the second display region, the layout diagram configured to emphasize images indicating the plurality of the specific apparatuses caused to perform the predetermined operation.

5. The energy management system according to claim 1, wherein:
   the information concerning the energy management system includes information indicating a total amount of power consumed by the energy management system as a whole; and
   the display is configured to display, in the first display region, the total amount of power consumed, and to display, in the second display region, the layout diagram configured to emphasize images indicating a predetermined number of the specific apparatuses in descending order of contribution to the total amount of power consumed.

6. The energy management system according to claim 1, further comprising:
   an input receiver configured to receive an instruction to update the display in the first display region, and to receive an instruction to update the display in the second display region;
   wherein the display is configured to update the display in the first display region when the instruction to update the display in the first display region is received by the input receiver, and to update the display in the second display region when the instruction to update the display in the second display region is received by the input receiver.

7. The energy management system according to claim 1, wherein
   the display is configured to display, in the second display region and in association with the image indicating the specific apparatus that is displayed with emphasis, notice that the information concerning the specific apparatus is being displayed in the first display region.

8. The energy management system according to claim 1, wherein:
   the information concerning the energy management system includes information indicating a total amount of power consumed by the energy management system as a whole; and
   the display is configured to display, in the first display region, the total amount of power consumed, and to display, in the second display region, the layout diagram configured to emphasize the image indicating the specific apparatus that consumes an amount of power that is greater than a predetermined threshold.

9. A terminal apparatus comprising:
   an acquirer configured to acquire information concerning an energy management system configured to control a plurality of apparatuses installed in a dwelling; and
   a display configured to display, in a first display region, the information acquired by the acquirer, and to display, in a second display region, a layout diagram in which images indicating the plurality of apparatuses are arranged at positions corresponding to installation locations of the plurality of apparatuses in the dwelling,
   wherein the display is configured:
      to display, when the information displayed in the first display region includes information concerning a specific apparatus among the plurality of apparatuses, an image indicating the specific apparatus in the second display region with relative emphasis; and
      to update, at a date and time that is not included in a target period, display in the first display region and display in the second display region with a first cycle, and to update, at a date and time that is included in the target period, the display in the first display region and the display in the second display region with a second cycle that is shorter than the first cycle, wherein the target period includes a first period that ends at a date and time set by a user and a second period that starts at the date and time set by the user.

10. A display control method comprising:
   acquiring information concerning an energy management system for controlling a plurality of apparatuses installed in a dwelling; and
   displaying, in a first display region, the acquired information, and displaying, in a second display region, a layout diagram in which images indicating the plurality of apparatuses are arranged at positions corresponding to installation locations of the plurality of apparatuses in the dwelling;

displaying, when the information displayed in the first display region includes information concerning a specific apparatus among the plurality of apparatuses, an image indicating the specific apparatus in the second display region with relative emphasis; and updating, at a date and time that is not included in a target period, display in the first display region and display in the second display region with a first cycle, and updating, at a date and time that is included in the target period, the display in the first display region and the display in the second display region with a second cycle that is shorter than the first cycle, wherein the target period includes a first period that ends at a date and time set by a user and a second period that starts at the date and time set by the user.

11. A non-transitory recording medium storing a program that causes a computer to function as:

an acquirer configured to acquire information concerning an energy management system for controlling a plurality of apparatuses installed in a dwelling; and a display configured to display, in a first display region, the information acquired by the acquirer, and to display, in a second display region, a layout diagram in which images indicating the plurality of apparatuses are arranged at positions corresponding to installation locations of the plurality of apparatuses in the dwelling, wherein the display is configured:

to display, when the information displayed in the first display region includes information concerning a specific apparatus among the plurality of apparatuses, an image indicating the specific apparatus in the second display region, with relative emphasis; and to update, at a date and time that is not included in a target period, display in the first display region and display in the second display region with a first cycle, and to update, at a date and time that is included in the target period, the display in the first display region and the display in the second display region with a second cycle that is shorter than the first cycle, wherein the target period includes a first period that ends at a date and time set by a user and a second period that starts at the date and time set by the user.

* * * * *